US012675921B2

(12) United States Patent
Aggarwal et al.

(10) Patent No.: US 12,675,921 B2
(45) Date of Patent: Jul. 7, 2026

(54) TEXT TO COLOR PALETTE GENERATION USING DIFFUSION MODELS

(71) Applicant: ADOBE INC., San Jose, CA (US)

(72) Inventors: Pranav Vineet Aggarwal, Santa Clara, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 179 days.

(21) Appl. No.: 18/609,102

(22) Filed: Mar. 19, 2024

(65) Prior Publication Data

US 2025/0299383 A1 Sep. 25, 2025

(51) Int. Cl.
| | |
|---|---|
| *G06T 11/10* | (2026.01) |
| *G06F 40/284* | (2020.01) |
| *G06F 40/40* | (2020.01) |
| *G06T 5/70* | (2024.01) |

(52) U.S. Cl.
CPC ............ *G06T 11/10* (2026.01); *G06F 40/284* (2020.01); *G06F 40/40* (2020.01); *G06T 5/70* (2024.01); *G06T 2207/10024* (2013.01); *G06T 2207/20081* (2013.01)

(58) Field of Classification Search
CPC ......... G06T 11/001; G06T 2207/20081; G06F 40/284; G06F 40/40; G09G 5/06; G06N 3/0455; G06N 3/08; G06N 3/0475
See application file for complete search history.

(56) References Cited

U.S. PATENT DOCUMENTS

| | | | |
|---|---|---|---|
| 11,216,505 B2 | 1/2022 | Motiian et al. | |
| 11,995,803 B1 * | 5/2024 | Karpman | ............ G06T 5/70 |

| | | | |
|---|---|---|---|
| 2020/0143570 A1 * | 5/2020 | Guido-Clark | ............ G06T 7/90 |
| 2020/0380298 A1 * | 12/2020 | Aggarwal | ........... G06F 18/2148 |
| 2022/0277039 A1 | 9/2022 | Aggarwal et al. | |
| 2024/0275912 A1 * | 8/2024 | Adato | .................. G06F 40/279 |
| 2025/0078346 A1 * | 3/2025 | Couleaud | ................. G06T 7/13 |

OTHER PUBLICATIONS

A. "Diffusing Colors: Image Colorization with Text Guided Diffusion" Zabari et al. DOI: https://doi.org/10.1145/3610548.3618180. SA Conference Papers '23: SIGGRAPH Asia 2023 Conference Papers, Sydney, NSW, Australia, Dec. 2023. https://dl.acm.org/doi/fullHtml/10.1145/3610548.3618180 (Year: 2023).*

1Ramesh, et al., "Hierarchical Text-Conditional Image Generation with Clip Latents", arXiv preprint arXiv:2204.06125v1 [cs.CV] Apr. 13, 2022. 27 pages.

2Radford, et al., "Learning Transferable Visual Models From Natural Language Supervision", arXiv preprint arXiv:2103.00020v1 [cs.CV] Feb. 26, 2021, 48 pages.

3Adobe Color, Accessed on Jan. 2023; Found on the Internet: https://color.adobe.com/create/image.

* cited by examiner

*Primary Examiner* — Antonio A Caschera

(74) *Attorney, Agent, or Firm* — F. CHAU & ASSOCIATES, LLC

(57) ABSTRACT

A method, apparatus, non-transitory computer readable medium, and system for text-to-color palette generation include encoding a text prompt to obtain text embedding. A color embedding is generated based on the text embedding by performing a diffusion process. Then a color palette is generated based on the color embedding. The color palette includes a plurality of colors corresponding to the text prompt.

18 Claims, 19 Drawing Sheets

Color Palette

"northern lights"

Promt Text    505 sunset

Figure 5:
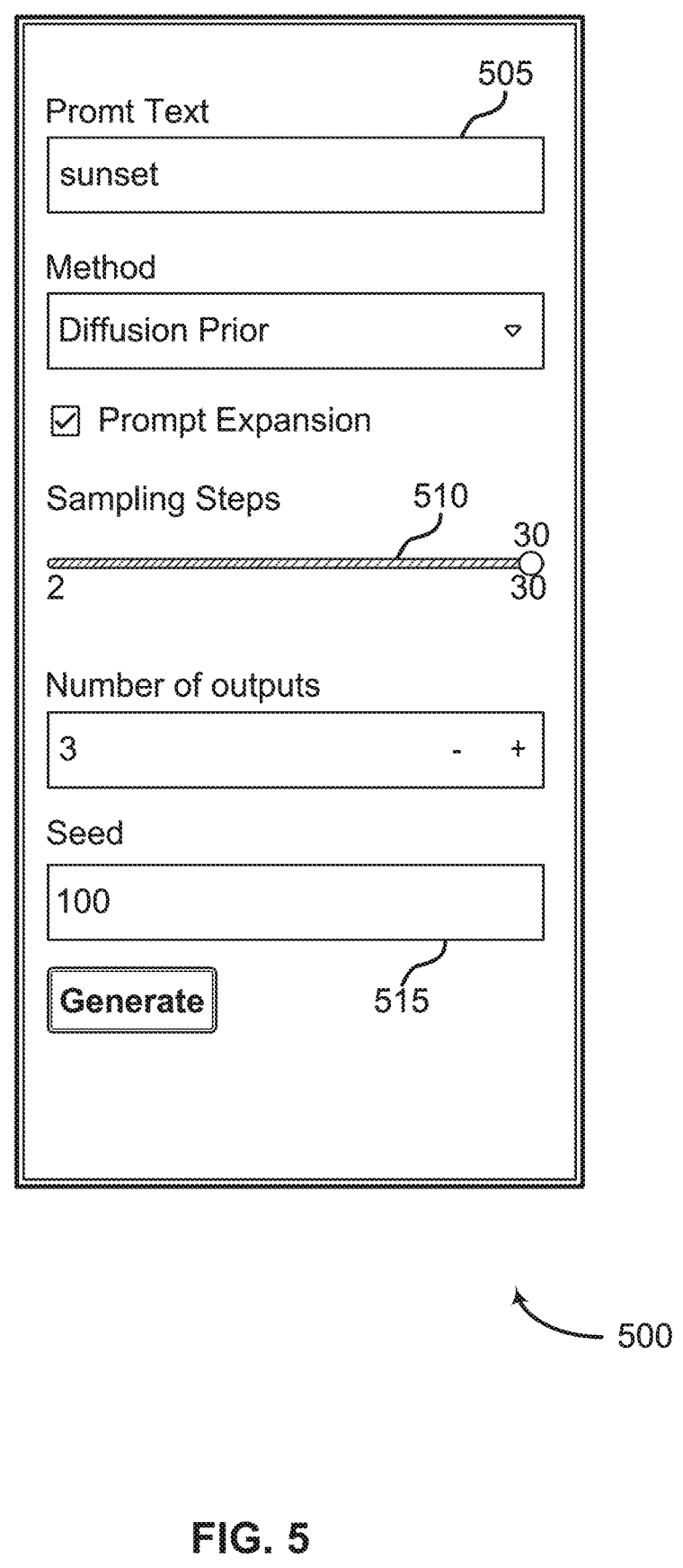

Method

Diffusion Prior ▽

☑ Prompt Expansion

Sampling Steps    510

30

2                             30

Number of outputs

3              -    +

Seed

100

Generate     515

"tulip fields, colors background, flat colors, solid colors, illustration"

705

0.106   0.057   0.054     . . .     0.035     . . .     0.030   0.029

0.098   0.088   0.056     . . .     0.033     . . .     0.024   0.024

0.081   0.074   0.058     . . .     0.034     . . .     0.026   0.026

0.173   0.064   0.060     . . .     0.034     . . .     0.027   0.027

. . .     . . .

800

"moss wall made of rocks painted with purple color"

Encode, using a text encoder, a text prompt to obtain text embedding — 1105

Generate, using a machine learning model, a color embedding based on the text embedding by performing a diffusion process — 1110

Generate a color palette, using the machine learning model, based on the color embedding, where the color palette includes a set of colors corresponding to the text prompt — 1115

Sample a set of noisy color embeddings  1705

Generate, using the machine learning model, a set of color embeddings based on the set of noisy color embeddings  1710

Generate a corresponding color palette based on each of the set of color embeddings, where the corresponding color palette includes a set of colors corresponding to the text prompt  1715

1700

Initialize a machine learning model — 1805

Obtain a training set including a training text prompt and a ground-truth color embedding — 1810

Train, using the training set, the machine learning model to generate color embeddings based on text prompts by performing a diffusion process on a noisy color embedding — 1815

1800

TEXT TO COLOR PALETTE GENERATION USING DIFFUSION MODELS

BACKGROUND

The following relates generally to text guided generation, and more specifically to text-to-color palette generation using machine learning. Text guided generation refers to the use of a machine learning model to perform tasks using an algorithm or a processing network. In some cases, text guided generation involves processing software that can be used for tasks such as text guided image editing, text guided image generation, etc.

Generative machine learning models can be used for a variety of tasks. For example, diffusion models can be used for various text-guided generation tasks including conditional generation (e.g., generation based on text guidance). Diffusion models can be trained to take random noise as input and generate unseen outputs with features similar to the training data.

SUMMARY

The present disclosure describes systems and methods for color palette generation. Embodiments of the present disclosure include a color palette generation apparatus configured to receive a text prompt and generate a color palette based on the text prompt using a machine learning model. Some embodiments generate, via a text encoder, a set of text token encodings and a text embedding based on the text prompt. A conversion model of the color palette generation apparatus takes the text token encodings, the text embedding, and a noisy color embedding as inputs and generate a denoised color embedding. In some cases, the conversion model includes a Transformer architecture that maps a text embedding space to a color embedding space and a diffusion model that generates color palette variations by performing a diffusion process.

A method, apparatus, and non-transitory computer readable medium for color palette generation are described. One or more embodiments of the method, apparatus, and non-transitory computer readable medium include encoding, using a text encoder, a text prompt to obtain text embedding; generating, using a machine learning model, a color embedding based on the text embedding by performing a diffusion process; and generating a color palette, using the machine learning model, based on the color embedding, wherein the color palette includes a plurality of colors corresponding to the text prompt.

A method, apparatus, and non-transitory computer readable medium for color palette generation are described. One or more embodiments of the method, apparatus, and non-transitory computer readable medium include initializing a machine learning model; obtaining a training set including a training text prompt and a ground-truth color embedding; and training, using the training set, the machine learning model to generate color embeddings based on text prompts by performing a diffusion process on a noisy color embedding.

An apparatus and method for color palette generation are described. One or more embodiments of the apparatus and method include at least one processor; at least one memory including instructions executable by the at least one processor; a machine learning model comprising parameters in the at least one memory, wherein the machine learning model comprises a text encoder trained to encode a text prompt to obtain text embedding; a conversion model trained to generate a color embedding based on the text embedding by performing a diffusion process; and a color palette component configured to generate a color palette based on the color embedding, wherein the color palette includes a plurality of colors corresponding to the text prompt.

BRIEF DESCRIPTION OF THE DRAWINGS

FIG. 5 shows an example of a user interface according to aspects of the present disclosure.

FIG. 10 shows an example of a color palette corresponding to a text prompt describing specific color according to aspects of the present disclosure.

FIG. 13 shows an example of a machine learning model according to aspects of the present disclosure.

DETAILED DESCRIPTION

Figure 1:
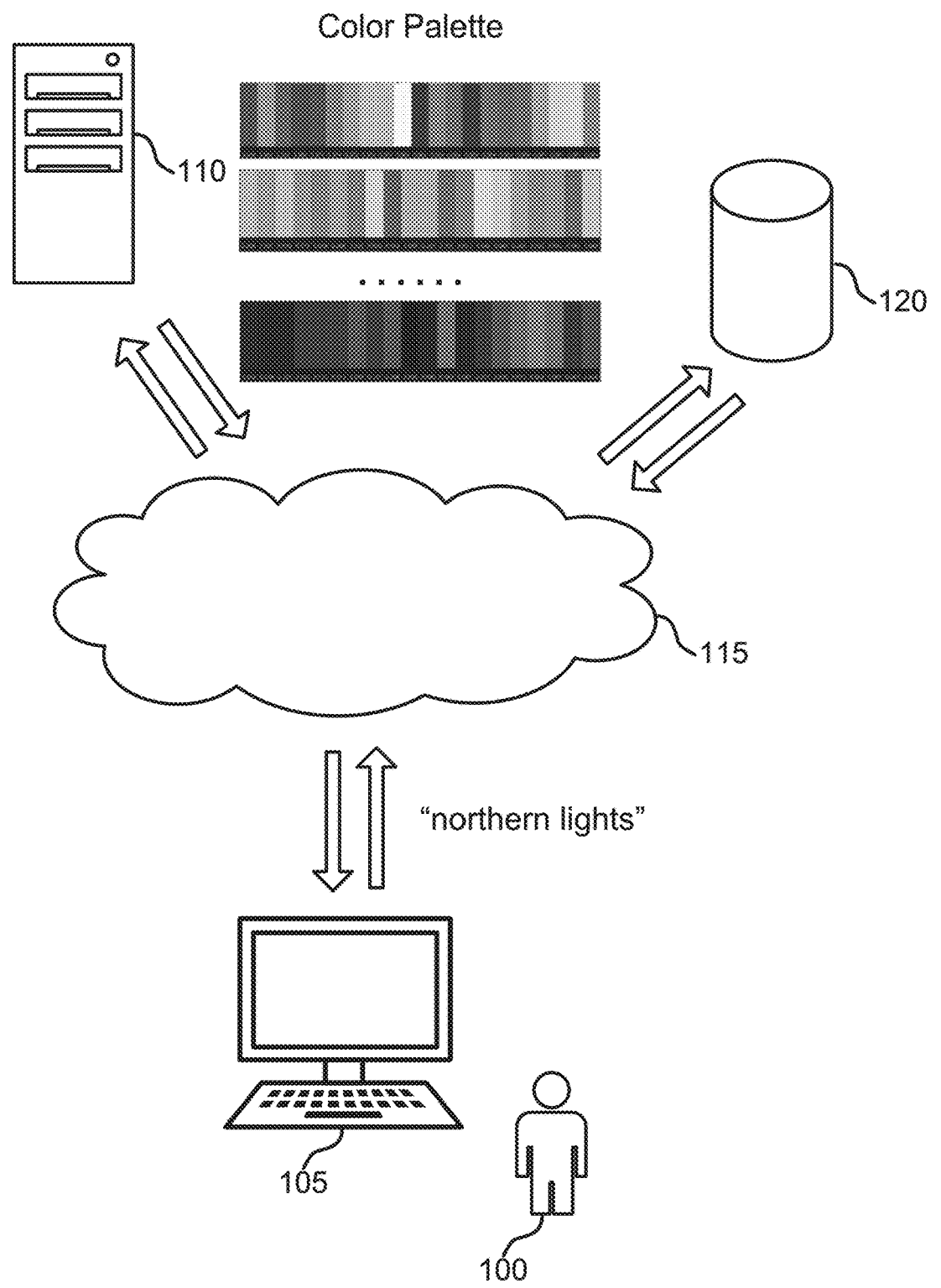
FIG. 1 shows an example of a color palette generation system according to aspects of the present disclosure.

The present disclosure describes systems and methods for color palette generation. Embodiments of the present disclosure include a color palette generation apparatus configured to receive a text prompt and generate a color palette based on the text prompt using a machine learning model. Some embodiments generate, via a text encoder, a set of text token encodings and a text embedding based on the text prompt. A conversion model of the color palette generation apparatus takes the text token encodings, the text embedding, and a noisy color embedding as inputs and generate a denoised color embedding. In some cases, the conversion model includes a Transformer architecture that maps a text embedding space to a color embedding space and a diffusion model that generates color palette variations by performing a diffusion process.

Recently, color palette models are used to map color text or user-defined tags to certain color palettes. In many cases, color palettes are directly tagged with generic color text or user-defined tags which can be noisy and these methods fail to cover a large variety of colors. Conventional models map color text to only one color histogram by mapping specified color text content to its corresponding color blobs. Accordingly, these models are limited in terms of palette accuracy and palette variations. Furthermore, conventional models sometimes depend on first extracting a color histogram from a synthesized image and the extra step of running text to image synthesis leads to longer inference time and costly memory consumption.

Diffusion models are a class of generative neural networks that can be trained to generate new data with features similar to features found in training data. Diffusion models can be used in generative tasks, such as image inpainting and image synthesis. In some examples, by varying the initial noise in an embedding space, diffusion models may generate diverse results when taking text information as a condition for image generation tasks.

Embodiments of the present disclosure include a color palette generation apparatus configured to generate a color palette based on a text prompt using a machine learning model. A text encoder of the machine learning model encodes the text prompt to obtain a set of text (token) encodings and a text embedding. A conversion model is trained to generate a color embedding based on the text embedding by performing a diffusion process on a noisy color embedding. The color palette generation apparatus then generates a color palette based on the color embedding, where the color palette includes a set of colors corresponding to the text prompt.

In some examples, the machine learning model includes a diffusion prior model comprising a decoder-only Transformer with a causal attention mask on a sequence including a set of encoded text tokens, the text embedding, an embedding for the diffusion time step, and a noisy color histogram/embedding. The diffusion prior model generates a denoised color histogram/embedding by performing a diffusion process. In some examples, the Transformer performs an attention mechanism on the text embedding to obtain the color embedding, where the text embedding and the color embedding are represented in a same vector space.

One or more embodiments of the present disclosure uniquely combine steps of using a Transformer to map a text embedding space to a color embedding space and generating color palette variations via a diffusion process. The machine learning model can generate a variety of color palettes directly based on a text prompt. The machine learning model generates different variations in parallel by sampling noisy color embeddings batch-wise (e.g., sampling from the same noise distribution multiple times in the form of batches, and denoise each of them in parallel to obtain variations). Additionally, mapping text embedding space to color embedding space using a diffusion prior model leads to faster color palette prediction and increased accuracy and diversity by sampling multiple noisy color embeddings and feeding them to the diffusion prior model.

Embodiments of the present disclosure include systems and methods that improve on conventional palette generation systems by generating more accurate and diversified color palettes in less time than using traditional methods. For example, the generated color palettes are more closely aligned with the output colors desired by the user. The color palettes may be generated using a custom-trained machine learning model. Some embodiments use a diffusion model to enable the creation of diverse color palette outputs.

In some embodiments, the user may describe a color term using different types of phrases (e.g., concept-related phrase, long and complex phrase, specific color(s)) and the model can handle a large variety of text prompts. Furthermore, the process for generating these color palettes is more efficient for the user (i.e., the machine learning model generates one or more color palettes directly on text and removes the step of generating an image followed by color histogram extraction), and users have more control by selecting different sampling steps or seed values to increase diversity in the output.

Some embodiments achieve this improved accuracy and efficiency using an architecture that takes a text prompt as an input to the machine learning model that is trained using training data including captions for training images, ground-truth color embeddings extracted from corresponding training images. The machine learning model includes a conversion model comprising a Transformer architecture. The conversion model maps a text embedding space to a color embedding space. At the same time, the conversion model generates color palette variations by performing a diffusion process on a noisy color embedding. In some examples, sampling from a same noise distribution multiple times provides different noisy color embeddings, which are then input to the conversion model (a diffusion prior). As a result, embodiments of the present disclosure improve on model latency, color palette variations from a single prompt and also improve color palette accuracy. The memory cost needed to store the model and run the model at inference time is reduced.

In some examples, a color palette generation apparatus based on the present disclosure receives a text prompt and then generates a color palette that includes a set of colors. An example application in the text-to-color palette generation context is provided with reference to FIGS. 2-10. Details regarding the architecture of an example color palette generation system are provided with reference to FIGS. 1 and 12-16. Details regarding the process of text-to-color palette generation are provided with reference to FIGS. 11 and 17. Detail regarding the training process is provided with reference to FIG. 18.

Color Palette Generation

In FIGS. 1-11, a method, apparatus, and non-transitory computer readable medium for color palette generation are described. One or more embodiments of the method, apparatus, and non-transitory computer readable medium include encoding, using a text encoder, a text prompt to obtain text embedding; generating, using a machine learning model, a color embedding based on the text embedding by performing a diffusion process; and generating a color palette, using the machine learning model, based on the color embedding, wherein the color palette includes a plurality of colors corresponding to the text prompt.

Some examples of the method, apparatus, and non-transitory computer readable medium further include performing an attention mechanism on the text embedding to obtain the color embedding, wherein the text embedding and the color embedding are represented in a same vector space.

Some examples of the method, apparatus, and non-transitory computer readable medium further include generating a plurality of text encodings based on the text prompt, wherein the attention mechanism is performed based on the plurality of text encodings.

Some examples of the method, apparatus, and non-transitory computer readable medium further include sampling a noisy color embedding. Some examples further include predicting noise based on the text embedding. Some examples further include removing the noise from the noisy color embedding to obtain the color embedding.

Some examples of the method, apparatus, and non-transitory computer readable medium further include sampling a plurality of noisy color embeddings. Some examples further include generating, using the machine learning model, a plurality of color embeddings based on the plurality of noisy color embeddings. In some examples, the text prompt includes a base color term and a color modifier.

Some examples of the method, apparatus, and non-transitory computer readable medium further include identifying a highest value among a plurality of values of the color embedding. Some examples further include selecting a color corresponding to the highest value.

Some examples of the method, apparatus, and non-transitory computer readable medium further include filtering the color embedding to obtain a filtered color embedding. Some examples further include sorting a plurality of values in the filtered color embedding, wherein the color palette is based on the sorting.

In some examples, the machine learning model is trained to generate color embeddings based on text prompts using a training set including a training text prompt and a ground-truth color embedding.

FIG. 1 shows an example of a color palette generation system according to aspects of the present disclosure. The example shown includes user 100, user device 105, color palette generation apparatus 110, cloud 115, and database 120. Color palette generation apparatus 110 is an example of, or includes aspects of, the corresponding element described with reference to FIG. 12.

In an example shown in FIG. 1, a text prompt (e.g., "northern lights") is provided by user 100 and transmitted to color palette generation apparatus 110, e.g., via user device 105 and cloud 115. The text prompt can have different types such as a long complex prompt, concept-related color prompt ("tiger"), a prompt comprising specific colors ("reddish blue", "olive green", "lemon yellow and lavender"). In some examples, the text prompt is provided via a user interface.

In some examples, a text encoder of color palette generation apparatus 110 encodes the text prompt to obtain a text embedding. A conversion model of color palette generation apparatus 110 generates a color embedding based on the text embedding by performing a diffusion process on a noisy color embedding. Color palette generation apparatus 110 generates a color palette based on the color embedding. The color palette includes a set of colors corresponding to the text prompt. In some cases, the conversion model includes a diffusion model and a transformer architecture. Color palette generation apparatus 110 returns the color palette to user 100 via cloud 115 and user device 105. In some examples, color palette generation apparatus 110 generates multiple different color palettes (as shown in FIG. 1) by sampling from the same noise distribution multiple times in the form of batches to obtain variations in generated color palettes (e.g., sampling a noisy color embedding n times as input to the conversion model).

User device 105 may be a personal computer, laptop computer, mainframe computer, palmtop computer, personal assistant, mobile device, or any other suitable processing apparatus. In some examples, user device 105 includes software that incorporates an image processing application (e.g., a color palette tool, an image editing tool). In some examples, the image processing application on user device 105 may include functions of color palette generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Color palette generation apparatus 110 includes a computer implemented network comprising a text encoder, a conversion model, a color palette component, and a data preparation component. Color palette generation apparatus 110 may also include a processor unit, a memory unit, an I/O module, a user interface, and a training component. The training component is used to train a machine learning model (or a color palette generation model). Additionally, color palette generation apparatus 110 can communicate with database 120 via cloud 115. In some cases, the architecture of the color palette generation network is also referred to as a network, a machine learning model, or a network model. Further detail regarding the architecture of color palette generation apparatus 110 is provided with reference to FIGS. 12-16. Further detail regarding the operation of color palette generation apparatus 110 is provided with reference to FIGS. 2, 11 and 17.

In some cases, color palette generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., training set comprising training text prompt, captions, and training images) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
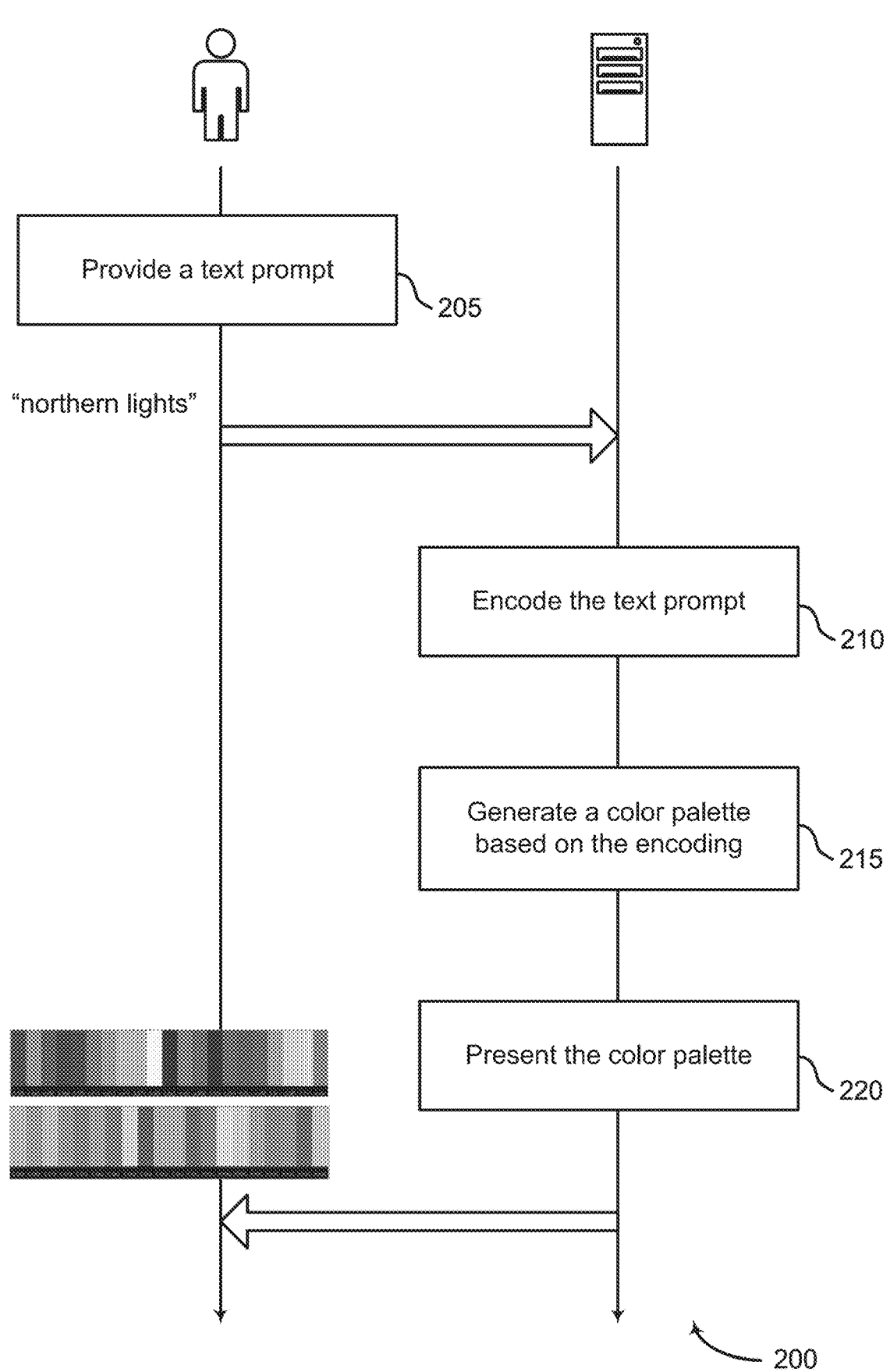
FIG. 2 shows an example of a method for text-to-color palette generation according to aspects of the present disclosure.

FIG. 2 shows an example of a method 200 for text-to-color palette generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a text prompt. In some cases, the operations of this step refer to, or may be performed by, a user as described with reference to FIG. 1. As an example, the text prompt is "northern lights". The system is configured to generate colors given a text prompt in a dynamic fashion. The user may describe colors using different types of text descriptions such as complex color mixtures e.g., "lavender and olive green", using objects to describe colors e.g., "brick wall" and scenes e.g., "tulip gardens with sunset". In some examples, the text prompt includes a color phrase depicting a color.

At operation 210, the system encodes the text prompt to obtain a text embedding. In some cases, the operations of this step refer to, or may be performed by, a color palette generation apparatus as described with reference to FIGS. 1 and 12.

At operation 215, the system generates a color palette based on the encoding, where the color palette includes a set of colors corresponding to the text prompt. In some cases, the operations of this step refer to, or may be performed by, a color palette generation apparatus as described with reference to FIGS. 1 and 12. In some examples, the color palette generation apparatus generates multiple different color palettes by injecting multiple noisy color embeddings to a conversion model (e.g., a diffusion model). For example, the conversion model samples a set of noisy color embeddings and generates a set of color embeddings based on the set of noisy color embeddings. The multiple different color palettes are then generated based on the set of color embeddings using histogram filtering and sorting methods. Detail regarding histogram filtering and sorting methods are described in FIGS. 12 and 13.

At operation 220, the system presents the color palette to the user. In the above example, multiple color palettes are presented to the user. In some cases, the operations of this step refer to, or may be performed by, a color palette generation apparatus as described with reference to FIGS. 1 and 12. Each of the color palettes includes a set of colors corresponding to the text prompt "northern lights". The color palette may be applied to downstream tasks such as color transfer, style transfer, color editing, etc. In some cases, users perform an image search based on the color palette.

In an embodiment, an apparatus may generate a color-transferred image based on the color palette, where the color-transferred image includes an element described in the text prompt.

Figure 3:
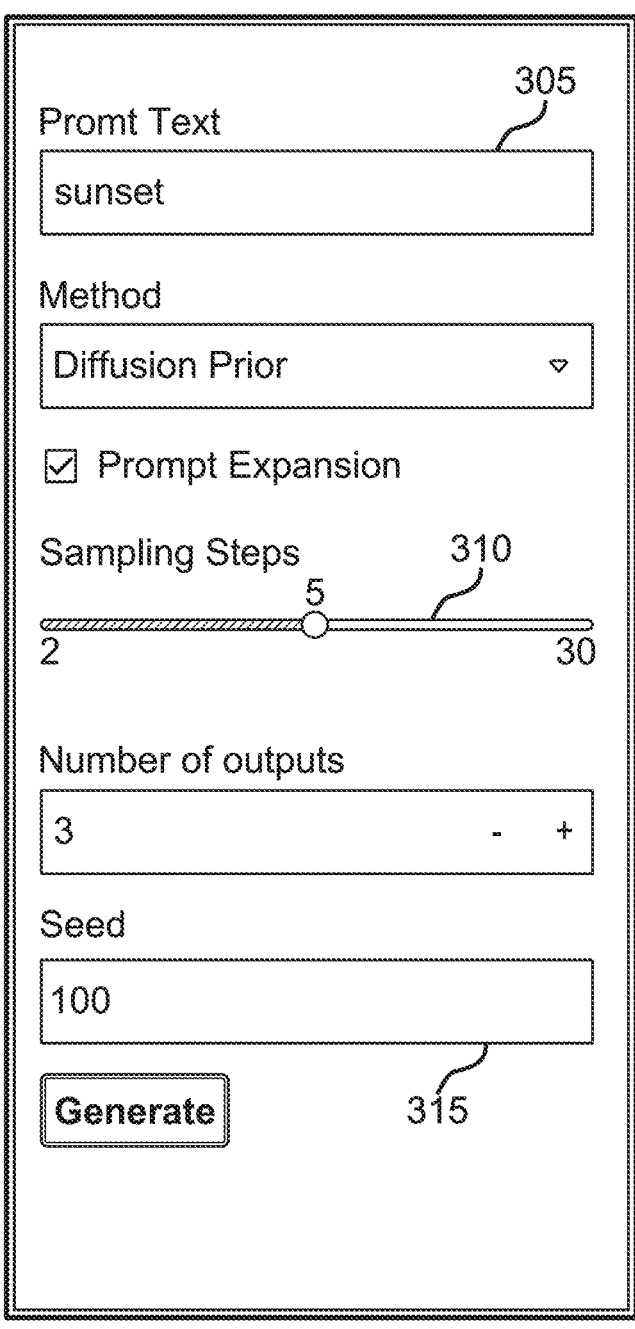
FIG. 3 shows an example of a user interface according to aspects of the present disclosure.

FIG. 3 shows an example of a user interface 300 according to aspects of the present disclosure. The example shown includes user interface 300, text prompt 305, sampling steps 310, and seed value 315. User interface 300 is an example of, or includes aspects of, the corresponding element described with reference to FIGS. 5 and 12. In some examples, user interface 300 includes a prompt text element for receiving text prompt 305, a sampling steps slider for receiving sampling steps 310, and a seed value element for receiving seed value 315. In addition, user interface 300 includes a method-selection dropdown menu where "Diffusion Prior" method is selected. In some cases, the dropdown menu is also known as a dropdown box or dropdown list. Once the "generate" button is clicked, one or more color palettes are generated using a backend machine learning model (refer to FIGS. 12 and 13).

In some cases, one color palette is generated, via the machine learning model, for a given text prompt. Some embodiments can obtain more variations in the color palette using oversampling. Diffusion models enable sampling from the same noise distribution multiple times in the form of batches to obtain variations. Instead of passing one noisy color embedding $X_t$ of dimension 1×1×1024, some embodiments sample multiple noisy color embeddings to create a batch of size n×1×1024 (2n×1×1024 for classifier-free guidance (CFG)) and denoise each of them parallelly. More detail about classifier-free guidance is described in FIGS. 13-14.

Figure 4:
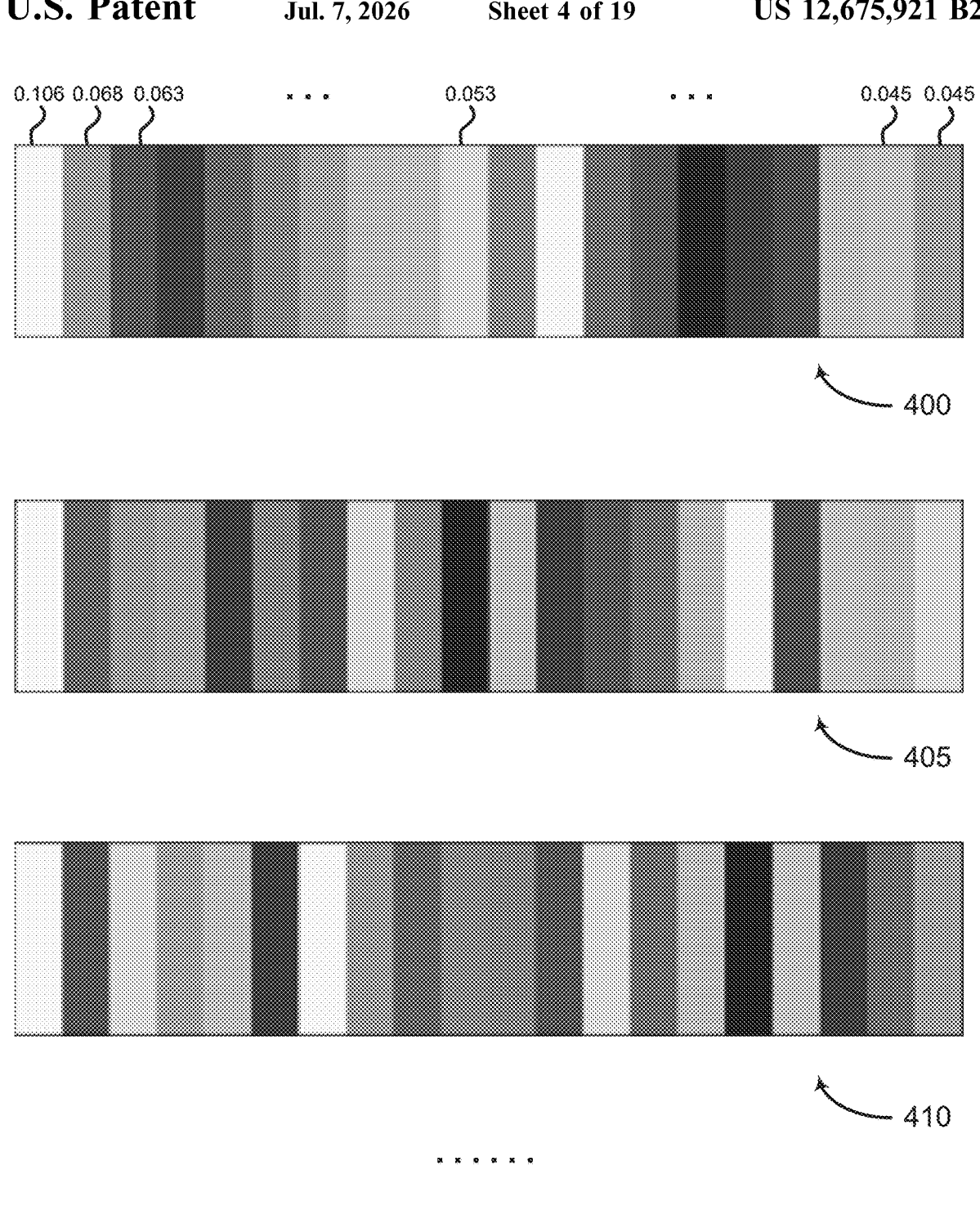
FIG. 4 shows an example of a generated color palette according to aspects of the present disclosure.

Diversity of the generated color palettes varies based on the number of sampling steps 310 used to denoise and also the guidance factor selected. Referring to FIGS. 3, 4, 5, and 6, an example includes text prompt 305, "sunset". The example shows that increasing the number of timesteps improves diversity significantly. Here, a value of sampling steps 310 is set to 5. The generated color palettes corresponding to sampling steps 310 are shown in FIG. 4.

By changing seed value 315, the backend machine learning model generates diverse color palettes by running on different seed values. This alters the noise distribution from which a noisy color embedding is sampled and hence the model generates more diverse color palettes (see FIGS. 4 and 6).

Text prompt 305 is an example of, or includes aspects of, the corresponding element described with reference to FIGS. 5, 7-10, 13, and 16. Sampling steps 310 is an example of, or includes aspects of, the corresponding element described with reference to FIG. 5. Seed value 315 is an example of, or includes aspects of, the corresponding element described with reference to FIG. 5.

FIG. 4 shows an example of a generated color palette according to aspects of the present disclosure. The example shown includes first color palette 400, second color palette 405, and third color palette 410. First color palette 400, second color palette 405, and third color palette 410 are variations in the generated color palettes. The (selected or entered) parameters are input to the machine learning model via user interface 300 (see FIG. 3) that is implemented on a user device such as a personal computer or mobile electronic device. The machine learning model generates first color palette 400, second color palette 405, and third color palette 410 among other variations. The machine learning model may generate more than three color palettes as shown in FIG. 4 and other additional generated color palettes are omitted herein for brevity. First color palette 400 includes a set of colors corresponding to the text prompt "sunset". Similarly, second color palette 405 and third color palette 410 include a set of colors corresponding to the text prompt "sunset", respectively.

First color palette 400 is an example of, or includes aspects of, the corresponding element described with reference to FIG. 6. Second color palette 405 is an example of, or includes aspects of, the corresponding element described with reference to FIG. 6. Third color palette 410 is an example of, or includes aspects of, the corresponding element described with reference to FIG. 6.

FIG. 5 shows an example of a user interface 500 according to aspects of the present disclosure. The example shown includes user interface 500, text prompt 505, sampling steps 510, and seed value 515. User interface 500 is an example of, or includes aspects of, the corresponding element described with reference to FIGS. 3 and 12.

Diversity of the generated color palettes varies based on the number of sampling steps 510 used to denoise and also the guidance factor selected. Referring to FIGS. 3, 4, 5, and 6, an example includes text prompt 505, "sunset". The example shows that increasing the number of timesteps improves diversity significantly. Here, a value of sampling steps 510 is set to 30. The generated color palettes corresponding to sampling steps 510 are shown in FIG. 6.

By changing seed value 515, the backend machine learning model generates diverse color palettes by running on different seed values. This alters the noise distribution from which a noisy color embedding is sampled and hence the machine learning model generates more diverse color palettes (see FIGS. 4 and 6).

Text prompt 505 is an example of, or includes aspects of, the corresponding element described with reference to FIGS. 3, 7-10, 13, and 16. Sampling steps 510 is an example of, or includes aspects of, the corresponding element described with reference to FIG. 3. Seed value 515 is an example of, or includes aspects of, the corresponding element described with reference to FIG. 3.

Figure 6:
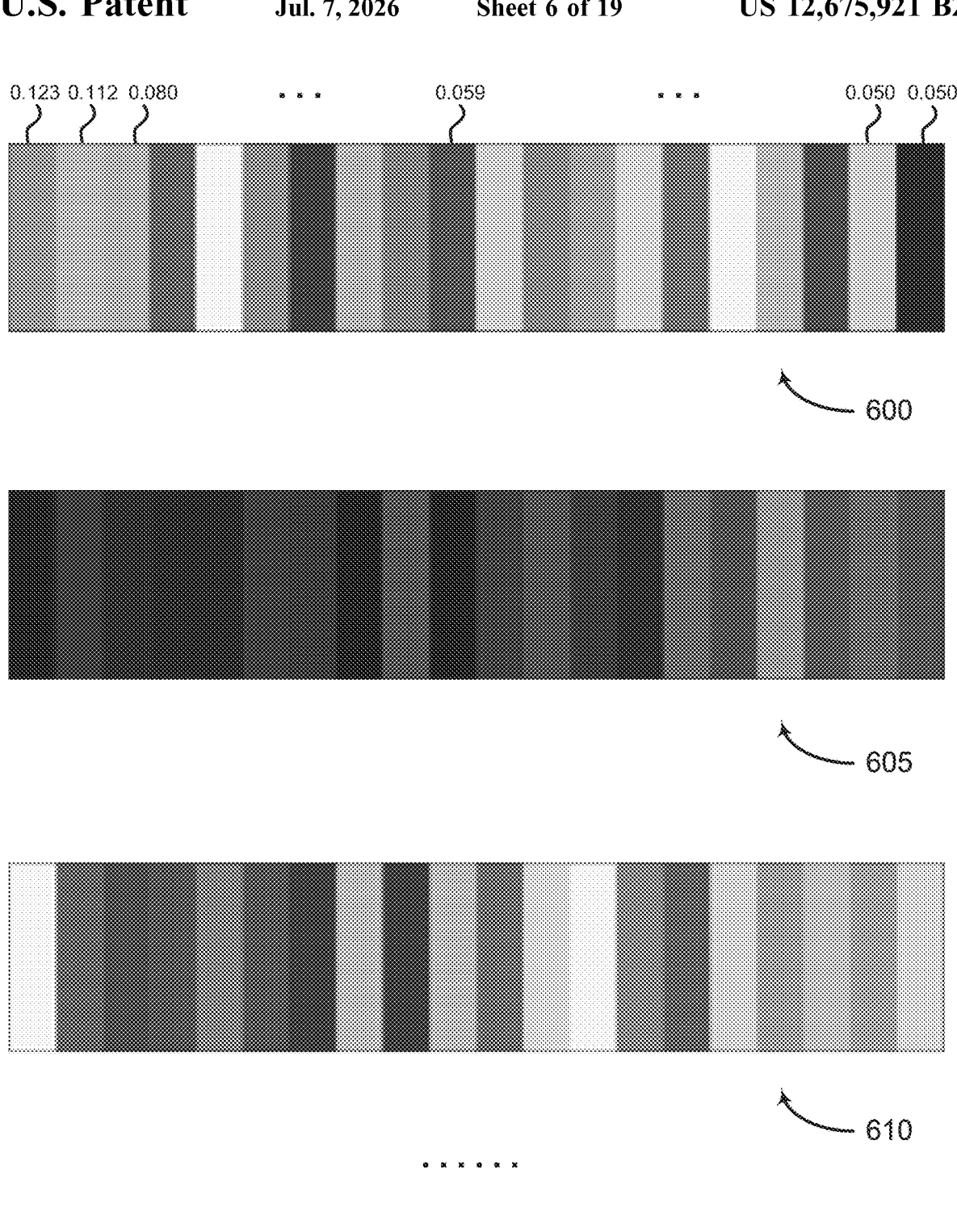
FIG. 6 shows an example of a generated color palette according to aspects of the present disclosure.

FIG. 6 shows an example of a generated color palette according to aspects of the present disclosure. The example shown includes first color palette 600, second color palette 605, and third color palette 610. First color palette 600, second color palette 605, and third color palette 610 are variations in the generated color palettes. The (selected or entered) parameters are input to the machine learning model via user interface 500 (see FIG. 5). The machine learning model generates first color palette 600, second color palette 605, and third color palette 610 among other variations. The machine learning model may generate more than three color palettes as shown in FIG. 6 and other additional generated color palettes are omitted herein for brevity. First color palette 600 includes a set of colors corresponding to the text prompt "sunset". Similarly, second color palette 605 and third color palette 610 include a set of colors corresponding to the text prompt "sunset", respectively.

First color palette 600 is an example of, or includes aspects of, the corresponding element described with reference to FIG. 4. Second color palette 605 is an example of, or includes aspects of, the corresponding element described with reference to FIGS. 4 and 13. Third color palette 610 is an example of, or includes aspects of, the corresponding element described with reference to FIG. 4.

Figure 7:
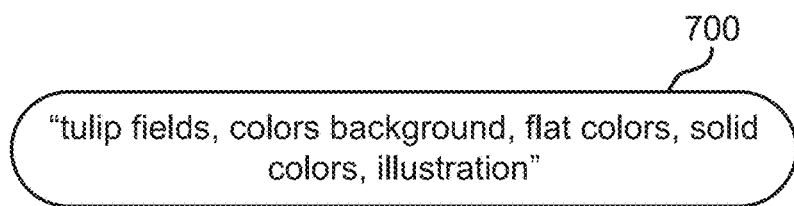
FIG. 7 shows an example of a color palette corresponding to a text prompt including an abstract phrase according to aspects of the present disclosure.

FIG. 7 shows an example of a color palette corresponding to a text prompt including an abstract phrase according to aspects of the present disclosure. The example shown includes text prompt 700 and color palette 705.

When receiving an initial text prompt, some embodiments apply prompt engineering methods to expand the initial text prompt offline to obtain expanded text prompts (e.g., text prompt 700 is an example of expanded text prompt). The machine learning model (with reference to FIGS. 12 and 13) generates one or more color palettes for each of the expanded text prompts. In some cases, prompt engineering methods include avoiding objects or particular words that can change the color palette in a negative fashion. Prompt engineering methods involve appending terms that are more abstract such as "colors background, flat colors, solid colors, Illustration", "colors background, digital art", "background", "colors background, oil painting", etc. FIG. 7 shows an example for text prompt "tulip fields" with prompt augmentation. In this example, text prompt 700 is "tulip fields, colors background, flat colors, solid colors, illustration". The machine learning model generates color palette 705 based on text prompt 700, where color palette 705 includes a set of colors corresponding to text prompt 700. Another augmented text prompt is "tulip fields background".

Text prompt 700 is an example of, or includes aspects of, the corresponding element described with reference to FIGS. 3, 5, 8-10, 13, and 16. Color palette 705 is an example of, or includes aspects of, the corresponding element described with reference to FIGS. 8-10.

Figure 8:
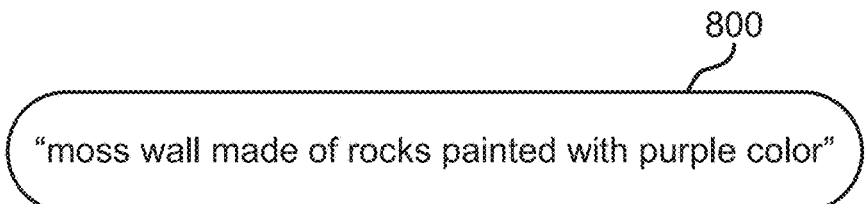
FIG. 8 shows an example of a color palette corresponding to a long complex text prompt according to aspects of the present disclosure.
Figure 8:
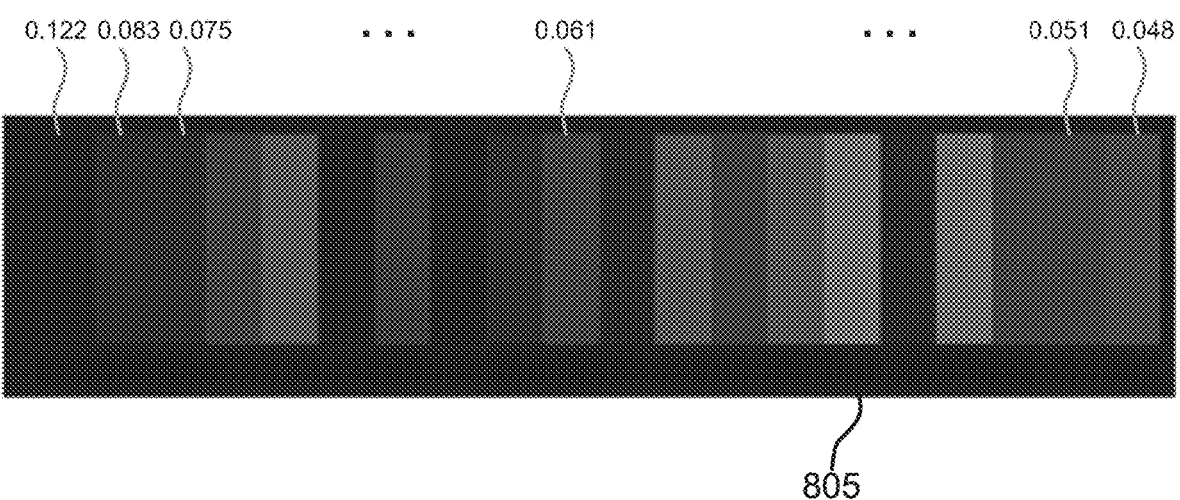
Figure 9:
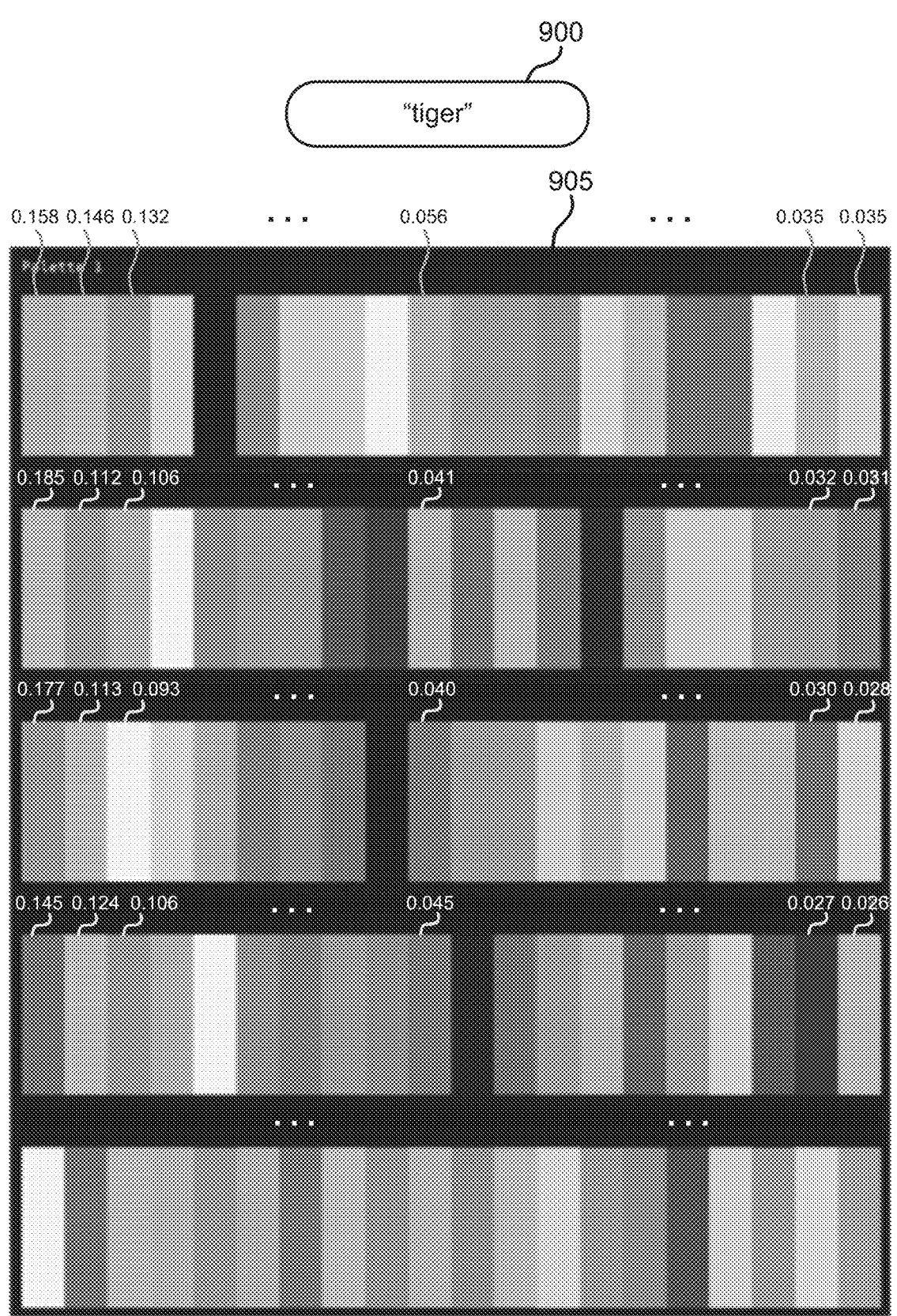
FIG. 9 shows an example of a color palette corresponding to a concept-related text prompt according to aspects of the present disclosure.
Figure 10:
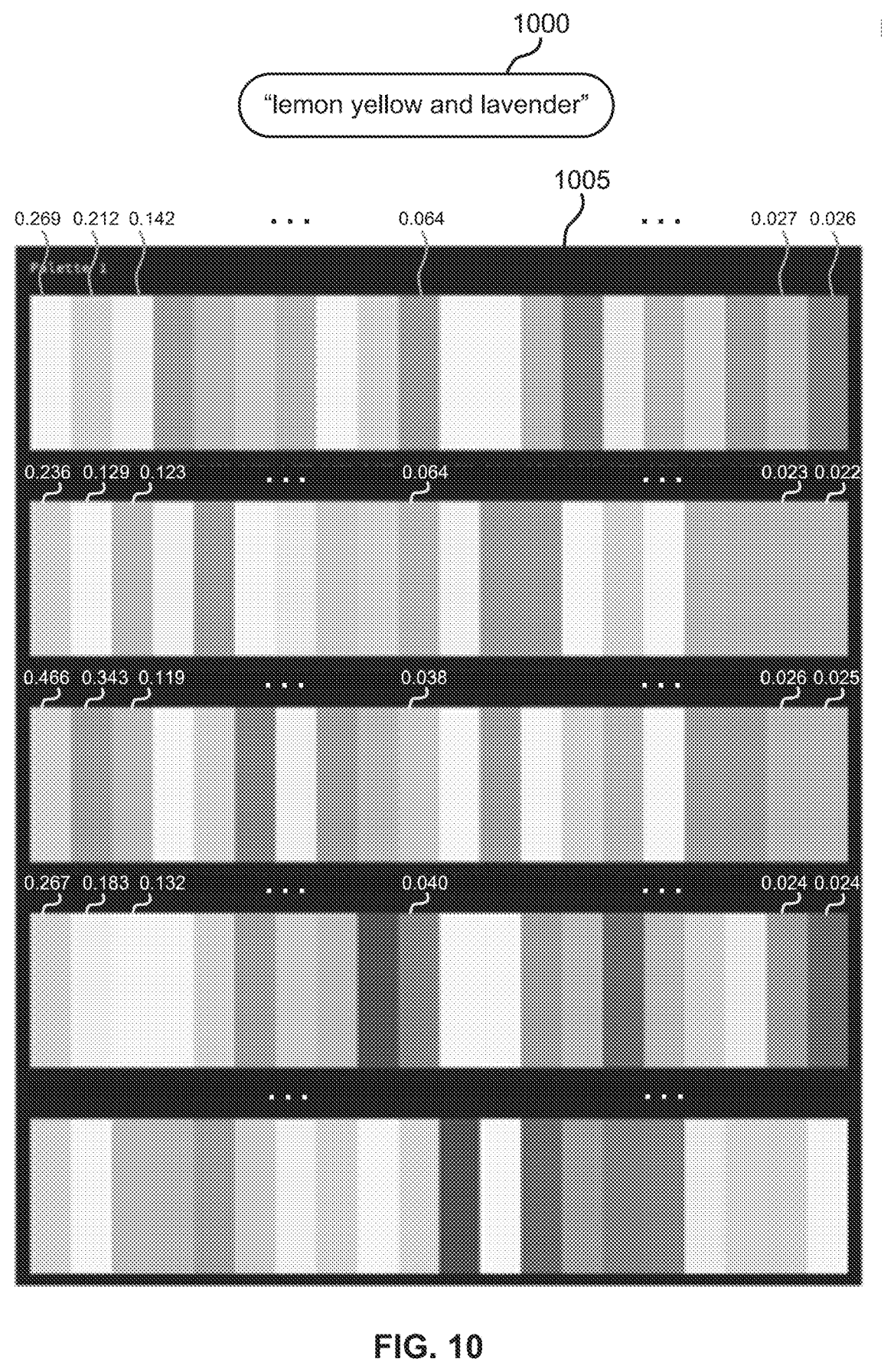

FIG. 8 shows an example of a color palette corresponding to a long complex text prompt according to aspects of the present disclosure. The example shown includes text prompt 800 and color palette 805. Some embodiments enable users to provide a large variety of text prompts, as shown in FIGS. 8, 9 and 10. In FIG. 8, the machine learning model can handle long complex text prompts. For example, text prompt 800 is "moss wall made of rocks painted with purple color". The machine learning model generates color palette 805 based on text prompt 800, where color palette 805 includes a set of colors corresponding to text prompt 800.

Text prompt 800 is an example of, or includes aspects of, the corresponding element described with reference to FIGS. 3, 5, 7, 9, 10, 13, and 16. Color palette 805 is an example of, or includes aspects of, the corresponding element described with reference to FIGS. 7, 9, and 10.

FIG. 9 shows an example of a color palette corresponding to a concept-related text prompt according to aspects of the present disclosure. The example shown includes text prompt 900 and color palette 905. In FIG. 9, the machine learning model can handle concept-related text prompts. For example, text prompt 900 is "tiger". Text prompt 900 does not include a color term or a color modifier by itself (i.e., just a concept term). The machine learning model can still generate color palette 905 based on text prompt 900, where color palette 905 includes a set of colors corresponding to text prompt 900. In this example, the set of colors represent typical colors associated with the concept "a tiger" (e.g., orange, yellow, brown).

In some examples, during training, the entire Adobe® Stock corpus is used to train the text-to-color palette model. The model may start generalizing certain object association with other elements in the images. For example, there are training images with objects isolated on white or black background. When a color histogram extractor converts these training images into their corresponding color histograms, the indices corresponding to black or white colors have a high value. This makes the machine leaning model create associations between these colors and those objects. During inference, white and black colors may show up for text prompts having these objects in it.

In some examples, if the training dataset has a lot of tiger images with blue sky in the background, the machine learning model may associate tiger colors (orange and yellow) with sky colors (blue). Then at inference, when the text prompt "tiger" is given, the machine learning model generates a color palette with yellow shades, orange shades and blue shades. The blue shades come from the sky colors (blue).

Text prompt 900 is an example of, or includes aspects of, the corresponding element described with reference to FIGS. 3, 5, 7, 8, 10, 13, and 16. Color palette 905 is an example of, or includes aspects of, the corresponding element described with reference to FIGS. 7, 8, and 10.

FIG. 10 shows an example of a color palette corresponding to a text prompt describing specific color(s) according to aspects of the present disclosure. The example shown includes text prompt 1000 and color palette 1005. In FIG. 10, the machine learning model can handle text prompts that include specific color(s). For example, text prompt 1000 is "lemon yellow and lavender". Text prompt 1000 includes a color term or a color modifier that is specific or the color term represents a specific type of color (e.g., "lemon yellow", "lavender"). The machine learning model generates color palette 1005 based on text prompt 1000, where color palette 1005 includes a set of colors corresponding to text prompt 1000. In this example, the set of colors represent colors associated with "lemon yellow" and "lavender" (e.g., yellow, dark yellow, light yellow, purple, dark purple, light purple).

Text prompt 1000 is an example of, or includes aspects of, the corresponding element described with reference to FIGS. 3, 5, 7-9, 13, and 16. Color palette 1005 is an example of, or includes aspects of, the corresponding element described with reference to FIGS. 7-9.

Figure 11:
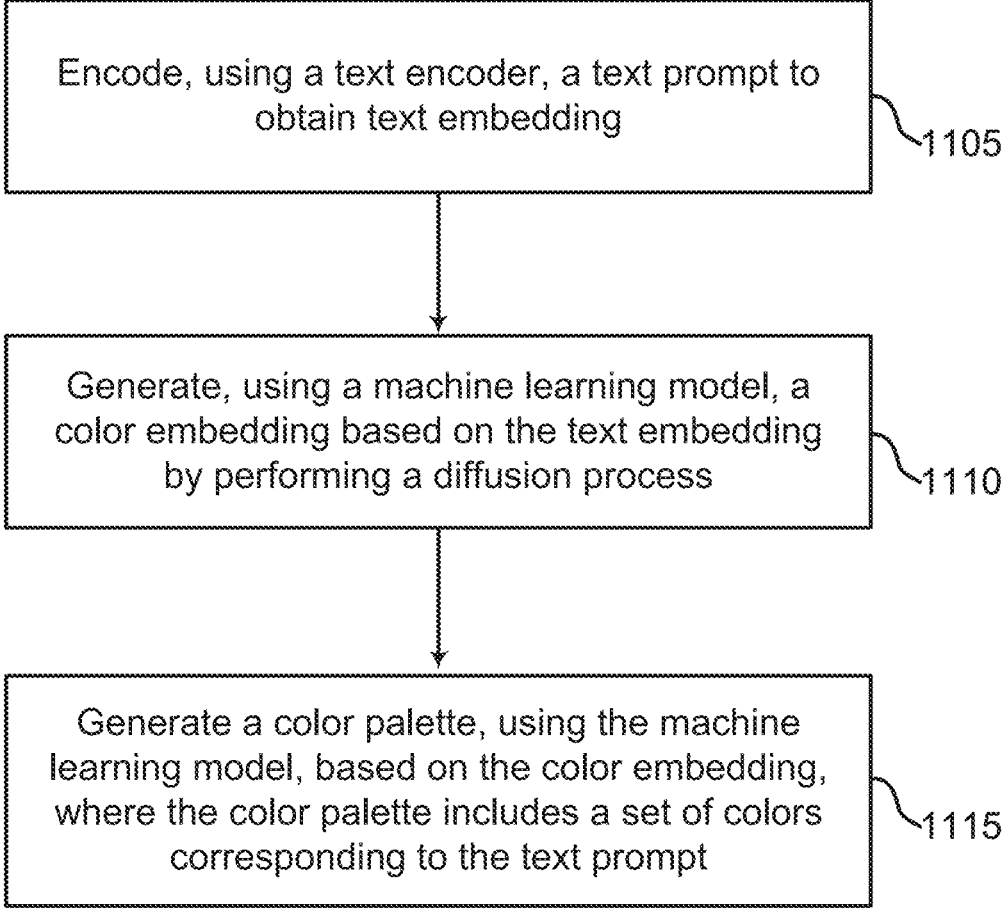
FIG. 11 shows an example of a method for color palette generation according to aspects of the present disclosure.

FIG. 11 shows an example of a method 1100 for color palette generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system encodes, using a text encoder, a text prompt to obtain text embedding. In some cases, the operations of this step refer to, or may be performed by, a text encoder as described with reference to FIGS. 12 and 13.

In some examples, a text prompt includes a base color term and a color modifier. In some examples, the text prompt can include different types of phrases such as concept-related color prompts (e.g., "tiger", "mud", "pastel flowers", "sunset", "northern lights"). The text prompt may include a long complex phrase such as "moss wall made of rocks painted with purple color". Alternatively, the text prompt describes specific color(s), e.g., "reddish blue", "olive green", "lemon yellow and lavender".

In some embodiments, the text encoder is a CLIP text encoder. CLIP (Contrastive Language-Image Pre-Training) model is a neural network trained on a variety of image-text pairs. CLIP encoder converts a text prompt into text representations (a text embedding) in a same embedding space as image embeddings (embeddings that derive from training images and used to construct color embeddings). Therefore, text representations can interact and have the same clustering as that of images from which the machine learning model obtains color embeddings.

At operation 1110, the system generates, using a machine learning model, a color embedding based on the text embedding by performing a diffusion process. In some cases, the operations of this step refer to, or may be performed by, a conversion model as described with reference to FIGS. 12 and 13. In some embodiments, the conversion model includes a transformer architecture where the transformer maps a text embedding space to a color embedding space. Additionally, the conversion model includes a diffusion model that generates color palette variations via a diffusion process for a given text prompt. In some examples, the conversion model generates a color embedding based on the text embedding by performing a diffusion process on a noisy color embedding.

At operation 1115, the system generates a color palette, using the machine learning model, based on the color embedding, where the color palette includes a set of colors corresponding to the text prompt. In some cases, the operations of this step refer to, or may be performed by, a color palette component as described with reference to FIGS. 12 and 13.

In an embodiment, the color palette component is configured to convert the color embedding into a color palette. The color palette component first removes the last 24 values of the color embedding (reducing dimensions from 1024 to 1000). The color palette component sorts the indices of the color histogram based on their values. The color palette component selects the top n colors and removes the rest of the colors. The color palette component also removes colors which may have zero scores in the top n selected color set. In some examples, the color palette includes a total of 20 top colors that are sorted based on their values in descending order (e.g., see FIG. 4, values corresponding to the colors in a generated color palette are 0.106, 0.068, 0.063, . . . , 0.053, . . . , 0.045, 0.045).

In some cases, multiple and varied but relevant color palettes are generated based on one text prompt. The text prompt can be modified using prompt engineering to achieve increased diversification in generated color palettes. In some examples, a text-to-color palette generator described in the present disclosure can generate N different variations for a single text prompt parallelly by sampling multiple noisy color embeddings batch-wise.

Network Architecture

In FIGS. 12-16, an apparatus and method for color palette generation are described. One or more embodiments of the apparatus and method include at least one processor; at least one memory including instructions executable by the at least one processor; a machine learning model comprising parameters in the at least one memory, wherein the machine learning model comprises: a text encoder trained to encode a text prompt to obtain text embedding; a conversion model trained to generate a color embedding based on the text embedding by performing a diffusion process; and a color palette component configured to generate a color palette based on the color embedding, wherein the color palette includes a plurality of colors corresponding to the text prompt.

In some examples, the conversion model comprises a transformer architecture. In some examples, the conversion model comprises a diffusion model. In some examples, the text encoder comprises a transformer architecture. Some examples of the apparatus and method further include a data preparation component configured to obtain a training set including a training text prompt and a ground-truth color embedding.

Figure 12:
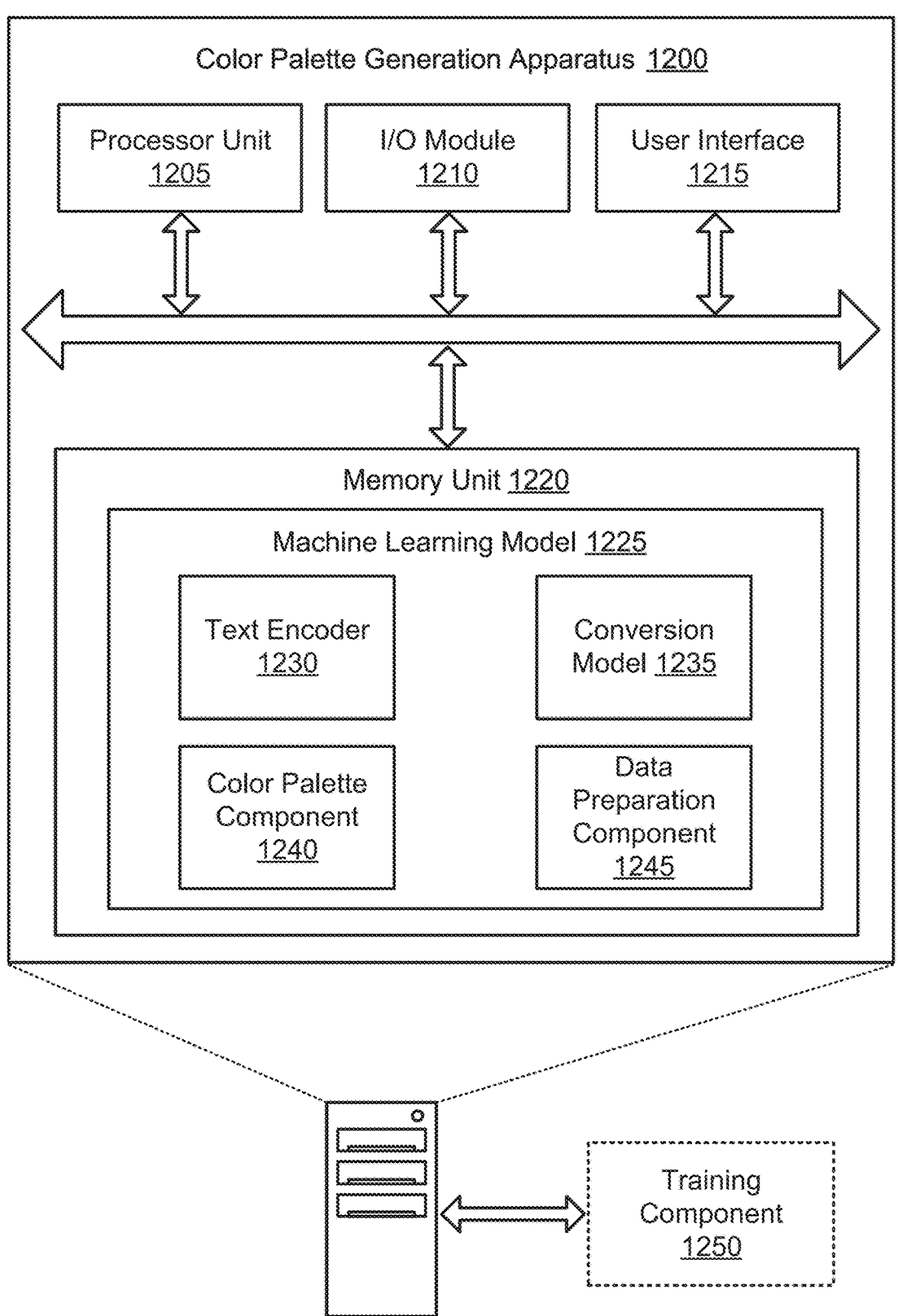
FIG. 12 shows an example of a color palette generation apparatus according to aspects of the present disclosure.

FIG. 12 shows an example of a color palette generation apparatus 1200 according to aspects of the present disclosure. The example shown includes color palette generation apparatus 1200, processor unit 1205, I/O module 1210, user interface 1215, memory unit 1220, machine learning model 1225, text encoder 1230, conversion model 1235, color palette component 1240, data preparation component 1245, and training component 1250. Color palette generation apparatus 1200 is an example of, or includes aspects of, the corresponding element described with reference to FIG. 1. User interface 1215 is an example of, or includes aspects of, the corresponding element described with reference to FIGS. 3 and 5.

Processor unit 1205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 1205 is configured to operate a memory array using a memory controller. In other cases, a memory controller is integrated into the processor. In some cases, processor unit 1205 is configured to execute computer-readable instructions stored in a memory to perform various functions. In some embodiments, processor unit 1205 includes special purpose components for modem processing, baseband processing, digital signal processing, or transmission processing.

Examples of memory unit 1220 include random access memory (RAM), read-only memory (ROM), or a hard disk. Examples of memory unit 1220 include solid state memory and a hard disk drive. In some examples, memory unit 1220 is used to store computer-readable, computer-executable software including instructions that, when executed, cause a processor to perform various functions described herein. In some cases, memory unit 1220 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 1220 store information in the form of a logical state.

In some examples, at least one memory unit 1220 includes instructions executable by the at least one processor unit 1205. Memory unit 1220 includes machine learning model 1225 or stores parameters of machine learning model 1225 for color palette generation.

I/O module 1210 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 1210 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, color palette generation apparatus 1200 includes a computer implemented artificial neural network (ANN) for text-to-color palette generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the machine learning model 1225 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, color palette generation apparatus 1200 includes a convolutional neural network (CNN) for text-to-color palette generation. CNN is a class of neural networks that is commonly used in computer vision or image classification systems. In some cases, a CNN may enable processing of digital images with minimal preprocessing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, text encoder 1230 encodes a text prompt to obtain text embedding. In some examples, text encoder 1230 generates a set of text encodings based on the text prompt, where the attention mechanism is performed based on the set of text encodings.

According to some embodiments, text encoder 1230 encodes the training text prompt to obtain a text embedding, where the machine learning model 1225 takes the text embedding as input.

According to some embodiments, text encoder 1230 is trained to encode a text prompt to obtain text embedding. In some examples, the text encoder 1230 includes a transformer architecture. Text encoder 1230 is an example of, or includes aspects of, the corresponding element described with reference to FIG. 13.

In some examples, the text prompt includes a base color term and a color modifier. In some embodiments, the machine learning model 1225 is trained to generate color embeddings based on text prompts using a training set including a training text prompt and a ground-truth color embedding. Machine learning model 1225 is an example of, or includes aspects of, the corresponding element described with reference to FIG. 13.

According to some embodiments, conversion model 1235 generates a color embedding based on the text embedding by performing a diffusion process. In some examples, conversion model 1235 performs an attention mechanism on the text embedding to obtain the color embedding, where the text embedding and the color embedding are represented in a same vector space. In some examples, conversion model 1235 samples a noisy color embedding. Conversion model 1235 predicts noise based on the text embedding. Conversion model 1235 removes the noise from the noisy color embedding to obtain the color embedding. In some examples, conversion model 1235 samples a set of noisy color embeddings. Conversion model 1235 generates a set of color embeddings based on the set of noisy color embeddings.

According to some embodiments, conversion model 1235 generates a predicted color embedding based on the noisy color embedding and the text embedding. Conversion model 1235 is trained to generate a color embedding based on the text embedding by performing a diffusion process on a noisy color embedding. In some examples, the conversion model 1235 includes a transformer architecture. In some examples, the conversion model 1235 includes a diffusion model. Conversion model 1235 is an example of, or includes aspects of, the corresponding element described with reference to FIG. 13.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Methods of operating diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

In some cases, diffusion models work by iteratively adding noise to the data during a forward process and then learning to recover the data by denoising the data during a reverse process. For example, during training, guided latent diffusion model may take an original image in a pixel space as input and apply forward diffusion process to gradually add noise to the original image to obtain noisy images at various noise levels.

Next, a reverse diffusion process (e.g., a U-Net ANN) gradually removes the noise from the noisy images at various noise levels to obtain an output image. In some embodiments of the present disclosure, conversion model 1235 is trained to generate color embeddings by performing a diffusion process on a noisy color embedding (accordingly the model outputs color palette) and not image pixels. In some examples, training the conversion model involves computing a loss function that minimizes over a predicted color embedding and a corresponding ground-truth color embedding.

According to some embodiments, color palette component 1240 generates a color palette based on the color embedding, where the color palette includes a set of colors corresponding to the text prompt. In some examples, color palette component 1240 identifies a highest value among a set of values of the color embedding. Color palette component 1240 selects a color corresponding to the highest value. In some examples, color palette component 1240 filters the color embedding to obtain a filtered color embedding. Color palette component 1240 sorts a set of values in the filtered color embedding, where the color palette is based on the sorting. Color palette component 1240 is an example of, or includes aspects of, the corresponding element described with reference to FIG. 13.

According to some embodiments, data preparation component 1245 obtains a training set including a training text prompt and a ground-truth color embedding. In some examples, data preparation component 1245 obtains an image including colors in the ground-truth color embedding, where the training text prompt includes a caption for the image and where the ground-truth color embedding is generated based on the image.

According to some embodiments, training component 1250 initializes a machine learning model 1225. In some examples, training component 1250 trains, using the training set, the machine learning model 1225 to generate color embeddings based on text prompts by performing a diffusion process on a noisy color embedding.

In some examples, training component 1250 computes a diffusion loss based on the ground-truth color embedding. Training component 1250 updates parameters of the machine learning model 1225 based on the diffusion loss. In some examples, training component 1250 computes a loss function by comparing the predicted color embedding to the ground-truth color embedding. Training component 1250 updates parameters of the machine learning model 1225 based on the loss function.

In some examples, training component 1250 identifies a pre-determined number of time steps. Training component 1250 updates parameters of the machine learning model 1225 based on the pre-determined number of time steps. In some cases, training component 1250 (shown in dashed line) is implemented on an apparatus other than color palette generation apparatus 1200.

Figure 13:
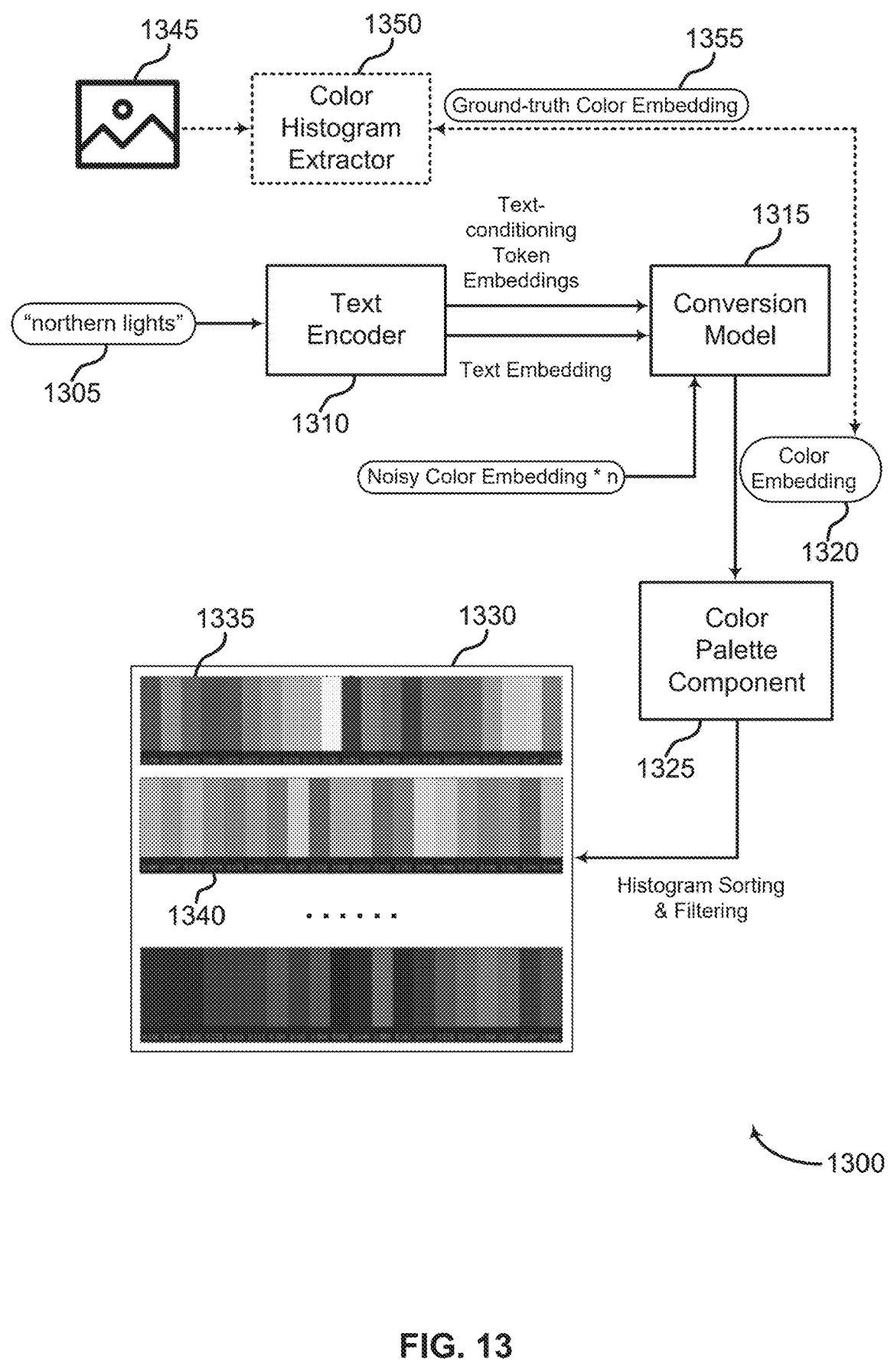

FIG. 13 shows an example of a machine learning model 1300 according to aspects of the present disclosure. The example shown includes machine learning model 1300, text prompt 1305, text encoder 1310, conversion model 1315, color embedding 1320, color palette component 1325, color palettes 1330, first color palette 1335, second color palette 1340, training image 1345, color histogram extractor 1350, and ground-truth color embedding 1355. Machine learning model 1300 is an example of, or includes aspects of, the corresponding element described with reference to FIG. 12.

In some embodiments, machine learning model 1300 includes conversion model 1315 (e.g., diffusion prior architecture) configured to implement text to palette generation. The conversion model 1315 includes a decoder-only Transformer with a causal attention mask on a sequence comprising CLIP encoded text tokens, CLIP text embedding, an embedding for the diffusion timestep, a noised color histogram embedding, and a final embedding whose output from the Transformer is used to predict the denoised color histogram embedding. In some cases, noised color histogram embedding is also referred to as noisy color embedding. The denoised color histogram embedding is also referred to as a color embedding.

In some embodiments, conversion model 1315 is configured to map the text CLIP embedding to its corresponding color histogram. Mathematically, conversion model 1315 is configured to generate color histograms $X_i$ from a distribution of color histograms derived from curated set of background or abstract images that can be represented as $P(X|Y)$ where $X \in R^{1024}$ symbolizes the color histogram, and Y is the associated text string.

At inference time, given text prompt 1305 (e.g., "northern lights"), text encoder 1310 extracts its CLIP text token encoding(s) and a text embedding. The shape and dimension of the text encoding is 76×1024 and the text embedding is 1×1024. To generate one color histogram, a single noisy color embedding, along with the text conditioning, is input to conversion model 1315 (e.g., a trained text-to-color palette encoder). After a set of sampling steps, conversion model 1315 generates the denoised color embedding/histogram (i.e. the color embedding). In some cases, to implement classifier-free guidance, conversion model 1315 samples twice, one with text condition and the other without the text condition and then perform classifier free guidance between them. Text encoder 1310 is an example of, or includes aspects of, the corresponding element described with reference to FIG. 12. Conversion model 1315 is an example of, or includes aspects of, the corresponding element described with reference to FIG. 12.

In some embodiments, CLIP text encoder is used to encode text prompt 1305. CLIP encoder converts text to text embeddings that are in a same embedding space as images. Therefore, the text representations can interact and have the same clustering as that of images from which conversion model 1315 obtains the color embeddings.

In an embodiment, color palette component 1325 is configured to convert the color embedding into a color palette. Color palette component 1325 first removes the last 24 values of the color embedding. Color palette component 1325 then sorts the indices of the color histogram based on their values. Color palette component 1325 selects the top n colors and filters the rest of the colors. Color palette component 1325 removes the colors which may have zero scores in the top n selected color set. Color palette component 1325 is an example of, or includes aspects of, the corresponding element described with reference to FIG. 12. For example, color palettes 1330 includes n color palettes comprising first color palette 1335, second color palette 1340. The number of generated color palettes depend on a number of noisy color embeddings that are input to conversion model 1315.

In some examples, instead of passing one noisy color embedding $X_t$ of dimension 1×1×1024, conversion model 1315 samples multiple embeddings to create a batch of size n×1×1024 (2n×1×1024 for CFG), for example, noisy color embedding×n. Conversion model 1315 denoises each of the n noisy color embeddings parallelly.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

During training, machine learning model 1300 includes color histogram extractor 1350 that takes training image 1345 as input. To compute ground-truth color embedding for training image 1345, color histogram extractor 1350 converts training image 1345 originally in RGB space to LAB space and then generates a 3D histogram. Color histogram extractor 1350 takes the square root of each number in the feature vector to obtain a final color embedding/histogram.

In some examples, histogram size of [10,10,10] is used and accordingly color histogram extractor 1350 generates a preliminary color embedding of size 1000. As the text CLIP embeddings are of size 1024, 24 zeros are padded to the preliminary color embedding to obtain the color embedding of 1024 dimensions. Machine learning model 1300 obtains 1000 fixed colors which the model generates scores for in the form of histogram embedding. Machine learning model 1300 then sorts these scores to obtain top n colors that are included in a color palette for a text prompt.

In some embodiments, a color embedding space can be created by determining a histogram of LAB based colors in a three-dimensional (3D) space. For example, an image (e.g., training image 1345) can be converted to its corresponding color palette by first converting its pixels into its corresponding LAB space and then using a histogram approach to convert the image representation into the 1504 sized color embedding. To compute histograms in LAB space, in some examples, a combination of histograms of sizes "[9, 7, 8]" and "[10, 10, 10]" may be used. For instance, two histograms can be calculated using "[9, 7, 8]" and "[10, 10, 10]" intervals and the histograms can be concatenated resulting in one feature vector. According to some embodiments, the square root of each number in the feature vector can be taken to get the final color embedding (e.g., taking the square root can penalize the dominant color and give other colors in the image more weights).

Text prompt 1305 is an example of, or includes aspects of, the corresponding element described with reference to FIGS. 3, 5, 7-10, and 16. Color embedding 1320 is an example of, or includes aspects of, the corresponding element described with reference to FIG. 16. First color palette 1335 is an example of, or includes aspects of, the corresponding element described with reference to FIGS. 4 and 6. Second color palette 1340 is an example of, or includes aspects of, the corresponding element described with reference to FIGS. 4 and 6.

Figure 14:
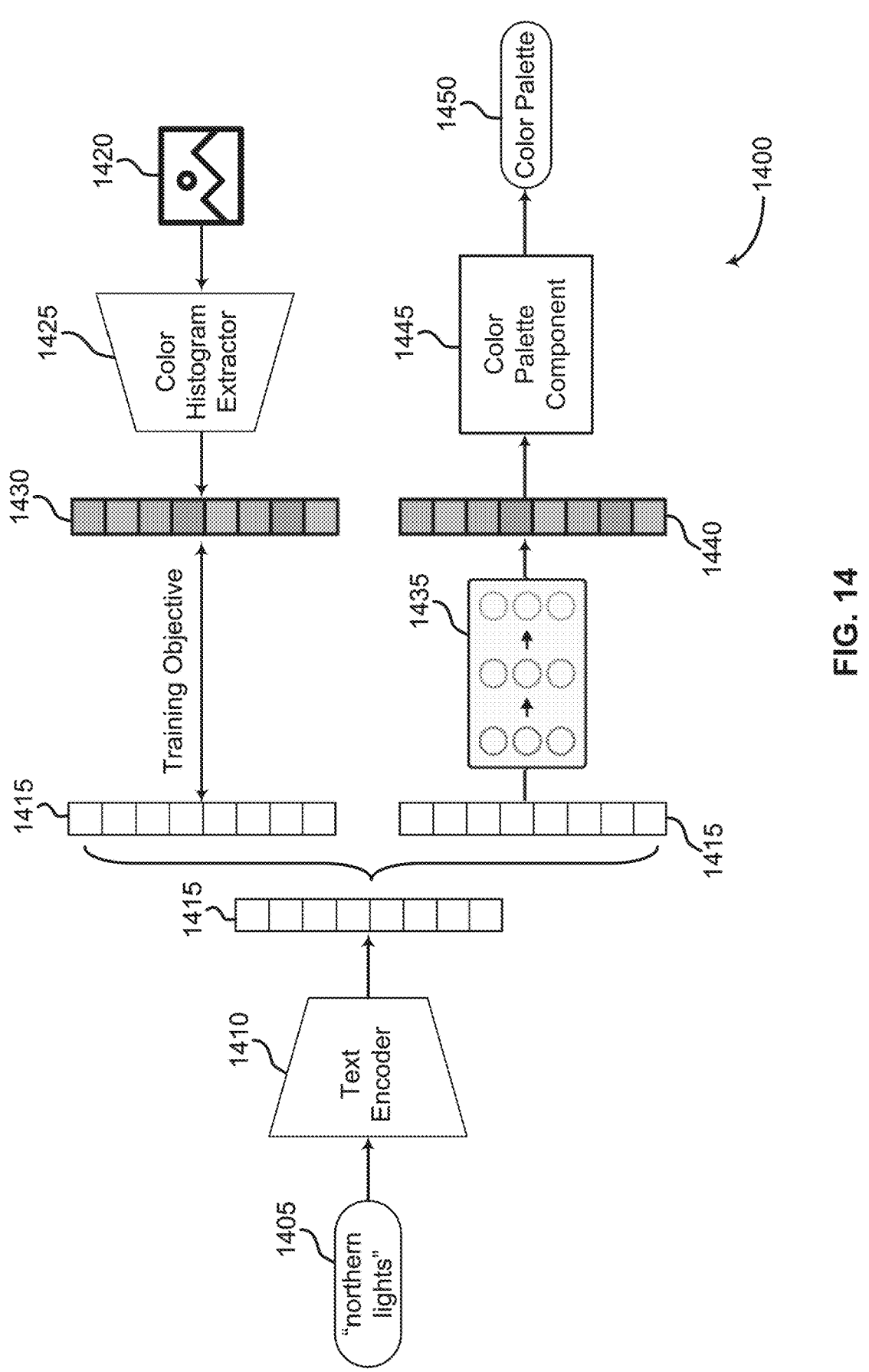
FIG. 14 shows an example of a machine learning model according to aspects of the present disclosure.

FIG. 14 shows an example of a machine learning model 1400 according to aspects of the present disclosure. The example shown includes machine learning model 1400, text prompt 1405, text encoder 1410, text embedding 1415, training image 1420, color histogram extractor 1425, ground-truth color embedding 1430, conversion model 1435, color embedding 1440, color palette component 1445, and color palette 1450. Machine learning model 1400 is an example of, or includes aspects of, the corresponding element described with reference to FIGS. 12 and 13.

FIG. 14 shows the CLIP training process (see upper half), through which the machine learning model 1400 learns a joint representation space for text and image color histograms (color histograms extracted from training images). For example, color histogram extractor 1425 is configured to take training image 1420 as input and generates a ground-truth color embedding 1430. In some cases, color histograms may also be referred to as color embeddings. Color histogram extractor 1425 is an example of, or includes aspects of, the corresponding element described with reference to FIG. 13.

FIG. 14 also shows text-to-color palette generation process. In some embodiments, text encoder 1410 takes a text prompt 1405 (e.g., "northern lights") as input and generates text embedding 1415. In some examples, text encoder 1410 includes a CLIP model and text embedding 1415 is a CLIP text embedding in a CLIP embedding space. The CLIP text embedding is first fed to a conversion model 1435 (a diffusion prior) to produce a color embedding 1440. The color embedding 1440 is then fed to color palette component 1445, which outputs color palette 1450. Text encoder 1410 is an example of, or includes aspects of, the corresponding element described with reference to FIGS. 12 and 13. Conversion model 1435 is an example of, or includes aspects of, the corresponding element described with reference to FIGS. 12 and 13. Color palette component 1445 is an example of, or includes aspects of, the corresponding element described with reference to FIGS. 12 and 13.

In some embodiments, the CLIP model is frozen during training of the diffusion prior model. The training dataset includes pairs (x, y) of images x and their corresponding captions y. Given an image x, let $z_i$ and $z_t$ be its color and text embeddings, respectively. A prior $P(z_i|y)$ that produces color embeddings $z_i$ conditioned on captions y. The diffusion prior is configured to learn a generative model of the color embeddings themselves. The diffusion prior model produces $z_i$ from captions y to enable color palette generations from text captions. The continuous vector $z_i$ is directly modeled using a Gaussian diffusion model conditioned on the caption y. In addition to the caption, some embodiments condition the prior model on the CLIP text embedding $z_t$ since it is a deterministic function of the caption. To improve sample quality, the training component enables sampling using classifier-free guidance for the diffusion prior, by randomly dropping this text conditioning information 10% of the time during training.

For the diffusion prior, some embodiments train a decoder-only Transformer with a causal attention mask on a sequence comprising the CLIP encoded text tokens, the CLIP text embedding, an embedding for the diffusion timestep, the noised color histogram embedding, and a final embedding whose output from the Transformer network is used to predict the unnoised color histogram embedding. During sampling time, to improve quality, the training component generates two samples of $z_i$ and selecting the one with a higher dot product with $z_t$. The diffusion prior model is trained to predict the unnoised $z_i$ directly, and a mean-squared error loss is applied on this prediction.

Text prompt 1405 is an example of, or includes aspects of, the corresponding element described with reference to FIGS. 3, 5, 7-10, 13, and 16. Text embedding 1415 is an example of, or includes aspects of, the corresponding element described with reference to FIG. 16. Training image 1420 is an example of, or includes aspects of, the corresponding element described with reference to FIG. 13. Ground-truth color embedding 1430 is an example of, or includes aspects of, the corresponding element described with reference to FIG. 13. Color embedding 1440 is an example of, or includes aspects of, the corresponding element described with reference to FIGS. 13 and 16. Color palette 1450 is an example of, or includes aspects of, the corresponding element described with reference to FIGS. 7-10.

Figure 15:
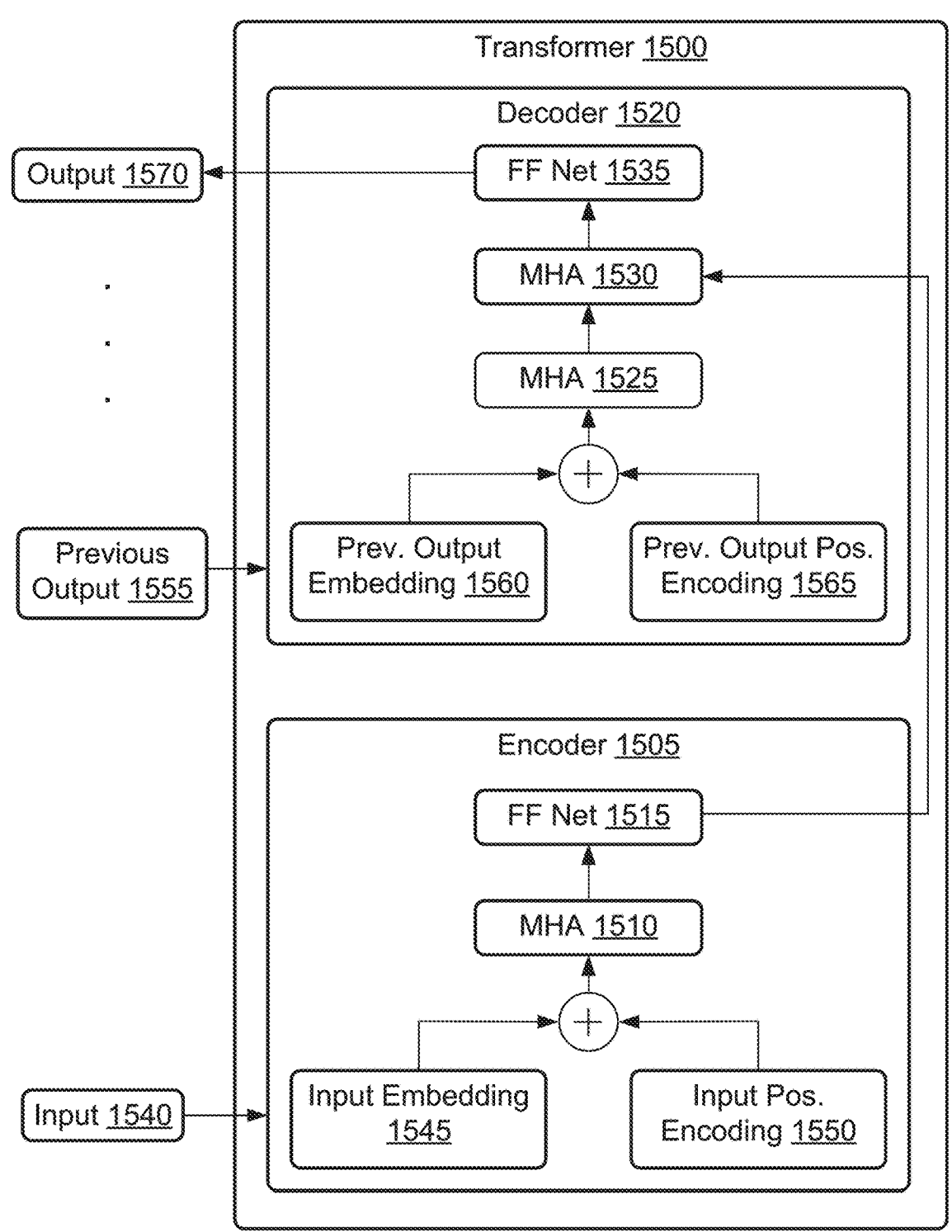
FIG. 15 shows an example of a transformer network according to aspects of the present disclosure.

FIG. 15 shows an example of a transformer network according to aspects of the present disclosure. The example shown includes transformer 1500, encoder 1505, decoder 1520, input 1540, input embedding 1545, input positional encoding 1550, previous output 1555, previous output embedding 1560, previous output positional encoding 1565, and output 1570.

In some cases, encoder 1505 includes multi-head self-attention sublayer 1510 and feed-forward network sublayer 1515. In some cases, decoder 1520 includes first multi-head self-attention sublayer 1525, second multi-head self-attention sublayer 1530, and feed-forward network sublayer 1535.

According to some aspects, a machine learning model (such as the machine learning model described with reference to FIGS. 12 and 13) comprises transformer 1500. In some cases, encoder 1505 is configured to map input 1540 (for example, a query or a prompt comprising a sequence of words or tokens) to a sequence of continuous representations that are fed into decoder 1520. In some cases, decoder 1520 generates output 1570 (e.g., a prediction of an output sequence of words or tokens) based on the output of encoder 1505 and previous output 1555 (e.g., a previously predicted output sequence), which allows for the use of autoregression.

For example, in some cases, encoder 1505 parses input 1540 into tokens and vectorizes the parsed tokens to obtain input embedding 1545, and adds input positional encoding 1550 (e.g., positional encoding vectors for input 1540 of a same dimension as input embedding 1545) to input embedding 1545. In some cases, input positional encoding 1550 includes information about relative positions of words or tokens in input 1540.

In some cases, encoder 1505 comprises one or more encoding layers (e.g., six encoding layers) that generate contextualized token representations, where each representation corresponds to a token that combines information from other input tokens via self-attention mechanism. In some cases, each encoding layer of encoder 1505 comprises a multi-head self-attention sublayer (e.g., multi-head self-attention sublayer 1510). In some cases, the multi-head self-attention sublayer implements a multi-head self-attention mechanism that receives different linearly projected versions of queries, keys, and values to produce outputs in parallel. In some cases, each encoding layer of encoder 1505 also includes a fully connected feed-forward network sublayer (e.g., feed-forward network sublayer 1515) comprising two linear transformations surrounding a Rectified Linear Unit (ReLU) activation:

$$FFN(x) = ReLU(W_1 x + b_1)W_2 + b_2 \qquad (1)$$

In some cases, each layer employs different weight parameters ($W_1$, $W_2$) and different bias parameters ($b_1$, $b_2$) to apply a same linear transformation each word or token in input 1540.

In some cases, each sublayer of encoder 1505 is followed by a normalization layer that normalizes a sum computed between a sublayer input x and an output sublayer(x) generated by the sublayer:

$$layernorm(x + sublayer(x)) \qquad (2)$$

In some cases, encoder 1505 is bidirectional because encoder 1505 attends to each word or token in input 1540 regardless of a position of the word or token in input 1540.

In some cases, decoder 1520 comprises one or more decoding layers (e.g., six decoding layers). In some cases, each decoding layer comprises three sublayers including a first multi-head self-attention sublayer (e.g., first multi-head self-attention sublayer 1525), a second multi-head self-attention sublayer (e.g., second multi-head self-attention sublayer 1530), and a feed-forward network sublayer (e.g., feed-forward network sublayer 1535). In some cases, each sublayer of decoder 1520 is followed by a normalization layer that normalizes a sum computed between a sublayer input x and an output sublayer(x) generated by the sublayer.

In some cases, decoder 1520 generates previous output embedding 1560 of previous output 1555 and adds previous output positional encoding 1565 (e.g., position information for words or tokens in previous output 1555) to previous output embedding 1560. In some cases, each first multi-head self-attention sublayer receives the combination of previous output embedding 1560 and previous output positional encoding 1565 and applies a multi-head self-attention mechanism to the combination. In some cases, for each word in an input sequence, each first multi-head self-attention sublayer of decoder 1520 attends only to words preceding the word in the sequence, and so transformer 1500's prediction for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 1505 by receiving a query Q from a previous sublayer of decoder 1520 and a key K and a value V from the output of encoder 1505, allowing decoder 1520 to attend to each word in the input 1540.

In some cases, each feed-forward network sublayer implements a fully connected feed-forward network similar to feed-forward network sublayer 1515. In some cases, the feed-forward network sublayers are followed by a linear transformation and a softmax to generate a prediction of output 1570 (e.g., a prediction of a next word or token in a sequence of words or tokens). Accordingly, in some cases, transformer 1500 generates a response as described herein based on a predicted sequence of words or tokens.

Figure 16:
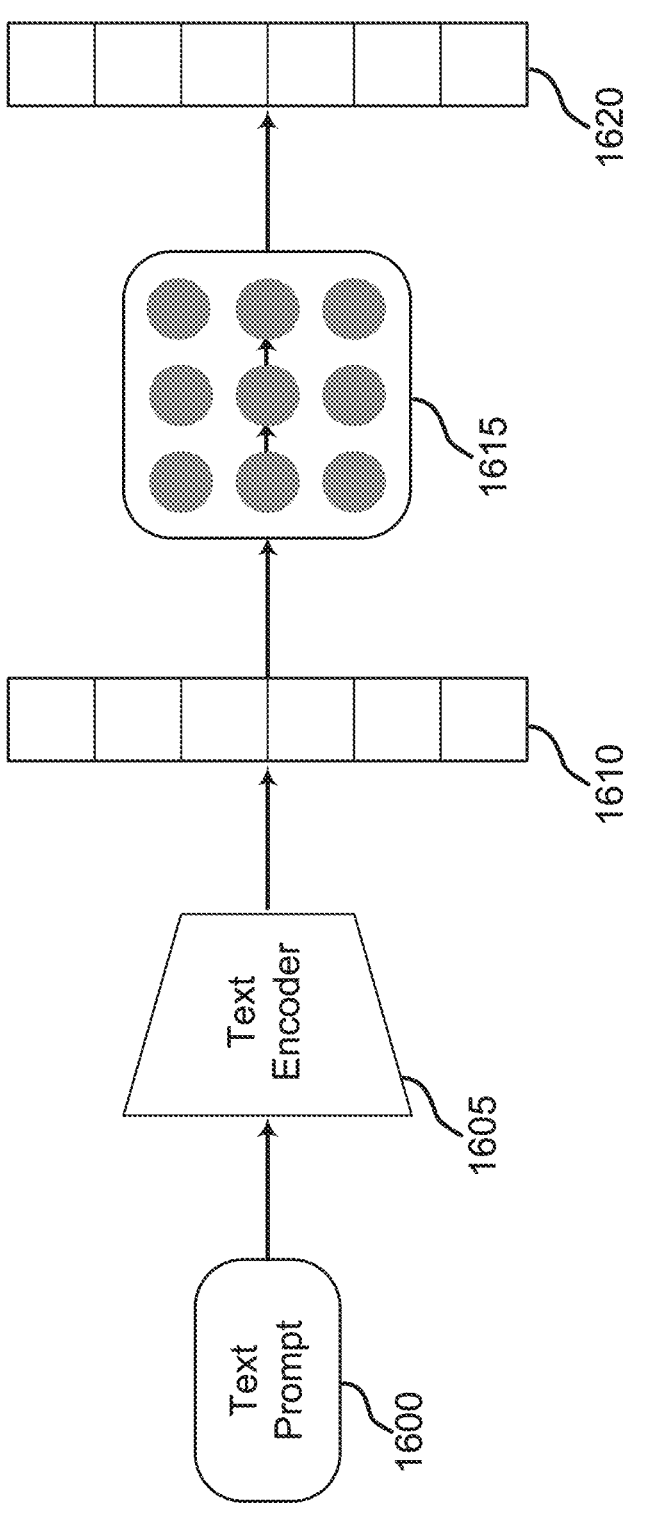
FIG. 16 shows an example of a diffusion prior model according to aspects of the present disclosure.

FIG. 16 shows an example of a diffusion prior model 1615 according to aspects of the present disclosure. The example shown includes text prompt 1600, multi-modal encoder 1605, text embedding 1610, diffusion prior model 1615, and color embedding 1620.

In some embodiments, diffusion prior model 1615 includes a diffusion-based mapping function that learns a target embedding when conditioned on a source embedding. For example, diffusion prior model 1615 is conditioned on text embedding 1610 to predict a corresponding color embedding 1620 (also referred to as color histogram or color histogram embedding). In some cases, the input conditioning is not limited to text conditioning, and may be replaced or augmented by other types of embeddings. For example, other types of embeddings include but are not limited to style embeddings of the image, tag embeddings, and sketch embeddings. These embeddings, with or without text embedding 1610, are input to diffusion prior model 1615 to predict a corresponding color embedding 1620.

In one embodiment, multi-modal encoder 1605 receives text prompt 1600 and generates text embedding 1610. In some cases, other embeddings such as style embedding, tag embedding, and/or sketch embedding are input into diffusion prior model 1615 together with text embedding 1610. Diffusion prior model 1615 received text embedding 1610 and one or more additional embeddings (of different modality or type) to generate color embedding 620.

In an embodiment, diffusion prior model 1615 generates a set of color embeddings based on text embedding 1610. Diffusion prior model 1615 scores and ranks the set of color embeddings by comparing each color embedding of color embeddings 1620 to text embedding 1610. In an embodiment, diffusion prior model 1615 calculates a similarity score between the text embedding 1610 and each color embedding of color embeddings 1620 and selects one or more color embeddings 1620 with the highest similarity score (e.g., select top k color embeddings that correspond to the top k highest similarity scores). A high similarity score shows that color embedding 1620 is similar to text embedding 1610 in a common embedding space. Text embedding 1610 and color embedding 1620 are in a multi-modal embedding space. For example, diffusion prior model 1615 ranks the set of color embeddings and selects a color embedding that is closest to the text CLIP embedding.

In an embodiment, diffusion prior model 1615 receives different types of input prompts. Diffusion prior model 1615 receives a text prompt, where the text prompt includes a word, a short phrase, or a long sentence. Multi-modal encoder 1605 encodes a text prompt to obtain a text embedding (e.g., text embedding 1610). Diffusion prior model 1615 receives a noisy color embedding and generates color embedding 620 based on the text embedding by performing a diffusion process on the noisy color embedding.

Multi-modal encoder 1605 is an example of, or includes aspects of, the corresponding element described with reference to FIGS. 12 and 13. Diffusion prior model 1615 is an example of, or includes aspects of, the corresponding element described with reference to FIGS. 12, 13, 14 and 15. Text prompt 1600 is an example of, or includes aspects of, the corresponding element described with reference to FIGS. 3, 5, 7-10, and 13. Color embedding 1620 is an example of, or includes aspects of, the corresponding element described with reference to FIG. 13.

Figure 17:
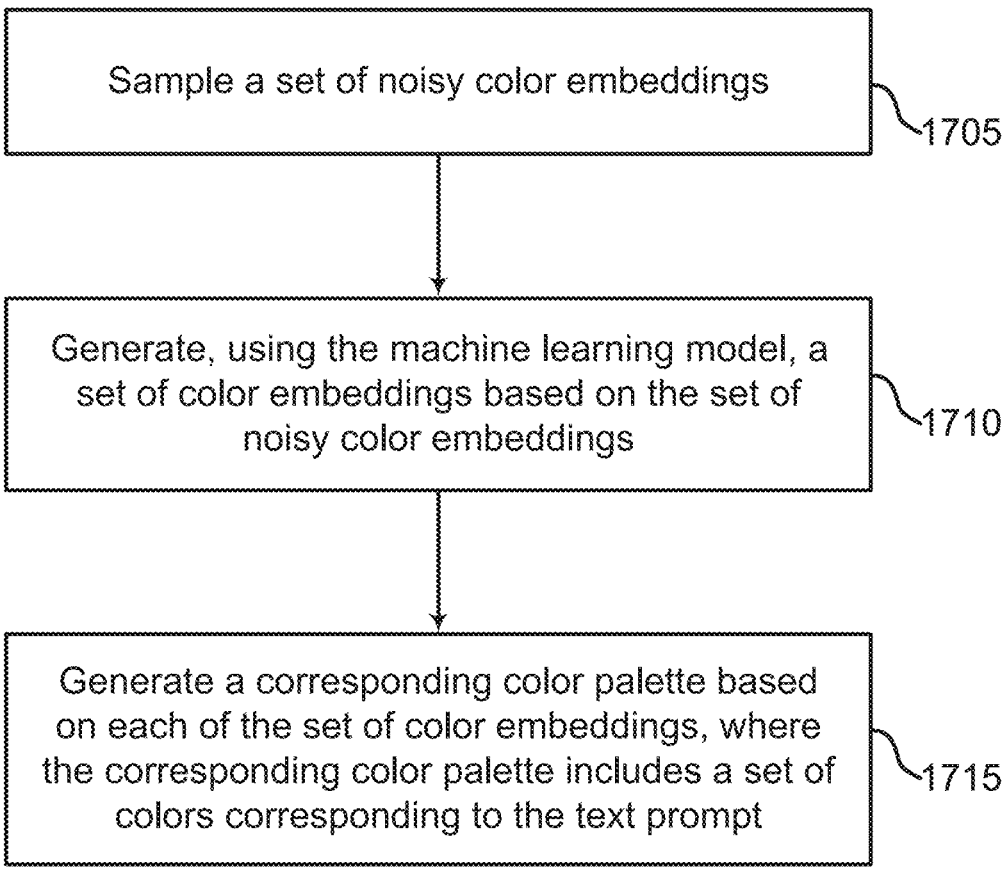
FIG. 17 shows an example of a method for generating multiple color palettes according to aspects of the present disclosure.

FIG. 17 shows an example of a method 1700 for generating multiple color palettes according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system samples a set of noisy color embeddings. In some cases, the operations of this step refer to, or may be performed by, a conversion model as described with reference to FIGS. 12 and 13. For example, the conversion model (e.g., a diffusion prior model) samples n noisy color embeddings to obtain more variations in generated color palettes. The machine learning model (with reference to FIG. 13) maps a text embedding to its corresponding color embedding. In some cases, the color embedding is also referred to as a color histogram.

At operation 1710, the system generates, using the machine learning model, a set of color embeddings based on the set of noisy color embeddings. In some cases, the operations of this step refer to, or may be performed by, a conversion model as described with reference to FIGS. 12 and 13. In an embodiment, the conversion model, by performing a diffusion process, can sample from the same noise distribution multiple times in the form of batches to obtain variations in generated color embeddings. Accordingly, diversity and variation in color palettes are increased as well. Instead of passing one noisy color embedding $X_t$ of dimension 1×1×1024, the conversion model samples multiple noisy color embeddings to create a batch of size n×1×1024 (2n×1×1024 for CFG) and denoises each of the noisy color embeddings parallelly.

At operation 1715, the system generates a corresponding color palette based on each of the set of color embeddings, where the corresponding color palette includes a set of colors corresponding to the text prompt. In some cases, the operations of this step refer to, or may be performed by, a color palette component as described with reference to FIGS. 12 and 13.

Training and Evaluation

Figure 18:
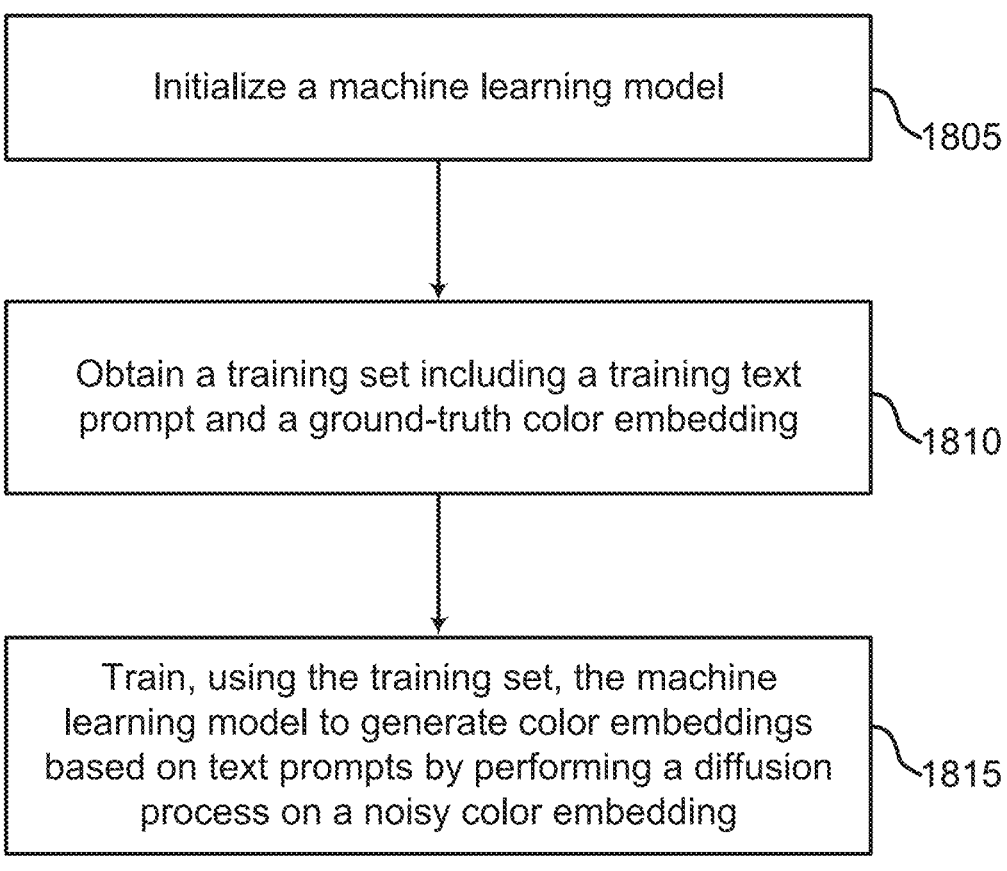
FIG. 18 shows an example of a method for training a machine learning model according to aspects of the present disclosure.

In FIG. 18, a method, apparatus, and non-transitory computer readable medium for color palette generation are described. One or more embodiments of the method, apparatus, and non-transitory computer readable medium include initializing a machine learning model; obtaining a training set including a training text prompt and a ground-truth color embedding; and training, using the training set, the machine learning model to generate color embeddings based on text prompts by performing a diffusion process on a noisy color embedding.

Some examples of the method, apparatus, and non-transitory computer readable medium further include computing a diffusion loss based on the ground-truth color embedding.

Some examples further include updating parameters of the machine learning model based on the diffusion loss.

Some examples of the method, apparatus, and non-transitory computer readable medium further include encoding the training text prompt to obtain a text embedding, wherein the machine learning model takes the text embedding as input.

Some examples of the method, apparatus, and non-transitory computer readable medium further include generating a predicted color embedding based on the noisy color embedding and the text embedding. Some examples further include computing a loss function by comparing the predicted color embedding to the ground-truth color embedding. Some examples further include updating parameters of the machine learning model based on the loss function.

Some examples of the method, apparatus, and non-transitory computer readable medium further include identifying a pre-determined number of time steps. Some examples further include updating parameters of the machine learning model based on the pre-determined number of time steps.

Some examples of the method, apparatus, and non-transitory computer readable medium further include obtaining an image including colors in the ground-truth color embedding, wherein the training text prompt comprises a caption for the image and wherein the ground-truth color embedding is generated based on the image.

FIG. 18 shows an example of a method 1800 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1805, the system initializes a machine learning model. In some cases, the operations of this step refer to, or may be performed by, a training component as described with reference to FIG. 12. The machine learning model includes a transformer architecture and a diffusion model (e.g., diffusion prior).

In some examples, background or abstract dataset is used for training the diffusion model. This method ensures that generated color palettes are more accurate and avoids generalizing to unwanted elements in the images, which are used to generate color palettes for training the machine learning model.

At operation 1810, the system obtains a training set including a training text prompt and a ground-truth color embedding. In some cases, the operations of this step refer to, or may be performed by, a data preparation component as described with reference to FIG. 12. In some examples, obtaining the training set includes creating training samples by extracting ground-truth color embeddings from a set of training images for training the machine learning model.

For training, a dataset comprising captions is input to the machine learning model and their corresponding images are input to a color histogram extractor to extract their color embeddings (i.e., serve as ground-truth color embeddings).

In some embodiments, the training set includes background or abstract dataset that do not have much color variations and complex scenes in their images. These training images have zoomed in object textures or minimalistic portrayal of the subject defined in the caption. Simple flat vector background images can be a part of the training dataset as they provide more discrete color palettes.

At operation 1815, the system trains, using the training set, the machine learning model to generate color embeddings based on text prompts by performing a diffusion process on a noisy color embedding. In some cases, the operations of this step refer to, or may be performed by, a training component as described with reference to FIG. 12.

Figure 19:
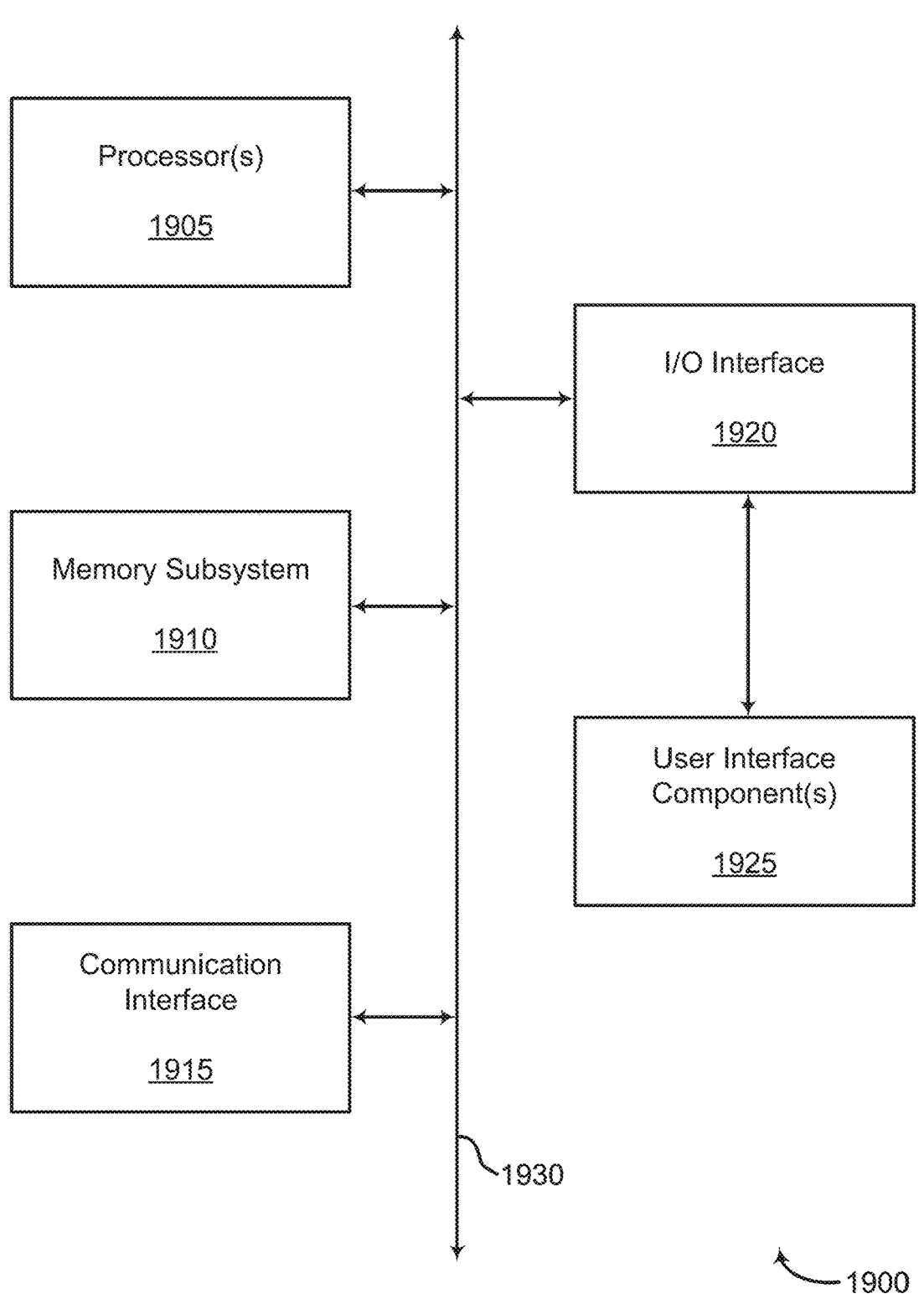
FIG. 19 shows an example of a computing device according to aspects of the present disclosure.

FIG. 19 shows an example of a computing device 1900 for generating color palettes according to aspects of the present disclosure. The example shown includes computing device 1900, processor(s) 1905, memory subsystem 1910, communication interface 1915, I/O interface 1920, user interface component(s) 1925, and channel 1930. In one embodiment, computing device 1900 includes processor(s) 1905, memory subsystem 1910, communication interface 1915, I/O interface 1920, user interface component(s) 1925, and channel 1930.

In some embodiments, computing device 1900 is an example of, or includes aspects of, color palette generation apparatus 110 of FIG. 1. In some embodiments, computing device 1900 includes one or more processors 1905 that can execute instructions stored in memory subsystem 1910 to encode, using a text encoder, a text prompt to obtain text embedding; generate, using a machine learning model, a color embedding based on the text embedding by performing a diffusion process; and generate a color palette, using the machine learning model, based on the color embedding, wherein the color palette includes a plurality of colors corresponding to the text prompt.

According to some embodiments, computing device 1900 includes one or more processors 1905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1915 operates at a boundary between communicating entities (such as computing device 1900, one or more user devices, a cloud, and one or more databases) and channel 1930 and can record and process communications. In some cases, communication interface 1915 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1920 is controlled by an I/O controller to manage input and output signals for computing device 1900. In some cases, I/O interface 1920 manages peripherals not integrated into computing device 1900. In some cases, I/O interface 1920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1920 or via hardware components controlled by the I/O controller.

According to some embodiments, user interface component(s) 1925 enable a user to interact with computing device 1900. In some cases, user interface component(s) 1925 include an audio device, such as an external speaker system, an external display device such as a display screen, an input device (e.g., a remote control device interfaced with a user interface directly or through the I/O controller), or a combination thereof. In some cases, user interface component(s) 1925 include a GUI.

Performance of apparatus, systems and methods of the present disclosure have been evaluated, and results indicate embodiments of the present disclosure have obtained increased performance over existing technology. Example experiments demonstrate that the color palette generation apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple micro-processors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infra-red, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
encoding, using a text encoder, a text prompt to obtain a text embedding and a plurality of text encodings;
generating, using a machine learning model, a color embedding based on the text embedding by performing an attention mechanism based on the text embedding and the plurality of text encodings and performing a diffusion process based on an output of the attention mechanism; and
generating a color palette, using the machine learning model, based on the color embedding, wherein the color palette includes a plurality of colors corresponding to the text prompt.

2. The method of claim 1,
wherein the text embedding and the color embedding are represented in a same vector space.

3. The method of claim 1, wherein generating the color embedding comprises:
sampling a noisy color embedding;
predicting noise based on the text embedding; and
removing the noise from the noisy color embedding to obtain the color embedding.

4. The method of claim 1, further comprising:
sampling a plurality of noisy color embeddings; and
generating, using the machine learning model, a plurality of color embeddings based on the plurality of noisy color embeddings.

5. The method of claim 1, wherein:
the text prompt includes a base color term and a color modifier.

6. The method of claim 1, wherein generating the color palette comprises:
identifying a highest value among a plurality of values of the color embedding; and
selecting a color corresponding to the highest value.

7. The method of claim 1, wherein generating the color palette comprises:
filtering the color embedding to obtain a filtered color embedding; and
sorting a plurality of values in the filtered color embedding, wherein the color palette is based on the sorting.

8. The method of claim 1, wherein:
the machine learning model is trained to generate color embeddings based on text prompts using a training set including a training text prompt and a ground-truth color embedding.

9. A method comprising:
initializing a machine learning model;
obtaining a training set including a training text prompt and a ground-truth color embedding; and
training, using the training set, the machine learning model to generate color embeddings based on text prompts by performing a diffusion process on a noisy color embedding, wherein the training comprises:
computing a diffusion loss based on the ground-truth color embedding; and
updating parameters of the machine learning model based on the diffusion loss.

10. The method of claim 9, wherein the training comprises:
encoding the training text prompt to obtain a text embedding, wherein the machine learning model takes the text embedding as input.

11. The method of claim 10, further comprising:
generating a predicted color embedding based on the noisy color embedding and the text embedding;
computing a loss function by comparing the predicted color embedding to the ground-truth color embedding; and
updating parameters of the machine learning model based on the loss function.

12. The method of claim 9, wherein the training comprises:
identifying a pre-determined number of time steps; and
updating parameters of the machine learning model based on the pre-determined number of time steps.

13. The method of claim 9, further comprising:
obtaining an image including colors in the ground-truth color embedding, wherein the training text prompt comprises a caption for the image and wherein the ground-truth color embedding is generated based on the image.

14. An apparatus comprising:
at least one processor;
at least one memory including instructions executable by the at least one processor; and
a machine learning model comprising parameters in the at least one memory, wherein the machine learning model comprises:
a text encoder trained to encode a text prompt to obtain a text embedding and a plurality of text encodings;
a conversion model trained to generate a color embedding based on the text embedding by performing an attention mechanism based on the text embedding and the plurality of text encodings and performing a diffusion process based on an output of the attention mechanism; and a color palette component configured to generate a color palette based on the color embedding, wherein the color palette includes a plurality of colors corresponding to the text prompt.

15. The apparatus of claim 14, wherein:
the conversion model comprises a transformer architecture.

16. The apparatus of claim 14, wherein:
the conversion model comprises a diffusion model.

17. The apparatus of claim 14, wherein:
the text encoder comprises a transformer architecture.

18. The apparatus of claim 14, further comprising:
a data preparation component configured to obtain a training set including a training text prompt and a ground-truth color embedding.

\* \* \* \* \*